United States Patent
Suzuki

(10) Patent No.: US 12,395,596 B2
(45) Date of Patent: Aug. 19, 2025

(54) IMAGE PROCESSING APPARATUS, NON-TRANSITORY COMPUTER READABLE MEDIUM, AND METHOD

(71) Applicant: FUJIFILM Business Innovation Corp., Tokyo (JP)

(72) Inventor: Kazutoshi Suzuki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 396 days.

(21) Appl. No.: 17/891,667

(22) Filed: Aug. 19, 2022

(65) Prior Publication Data

US 2023/0308580 A1 Sep. 28, 2023

(51) Int. Cl.
*H04N 1/23* (2006.01)
*H04N 1/00* (2006.01)

(52) U.S. Cl.
CPC ....... *H04N 1/2384* (2013.01); *H04N 1/00679* (2013.01); *H04N 1/00931* (2013.01); *H04N 1/2323* (2013.01); *H04N 1/233* (2013.01)

(58) Field of Classification Search
CPC ............. H04N 1/2384; H04N 1/00679; H04N 1/00931
See application file for complete search history.

(56) References Cited

U.S. PATENT DOCUMENTS

| | | | |
|---|---|---|---|
| 5,726,762 A | 3/1998 | Akada et al. | |
| 10,116,827 B2* | 10/2018 | Egami | G06V 30/1423 |
| 2013/0328766 A1* | 12/2013 | Igarashi | G06F 3/04883 |
| | | | 345/156 |

FOREIGN PATENT DOCUMENTS

| | | |
|---|---|---|
| JP | H08-097991 A | 4/1996 |
| JP | 2009-223696 A | 10/2009 |
| JP | 2009-223738 A | 10/2009 |

* cited by examiner

*Primary Examiner* — Ibrahim Siddo
(74) *Attorney, Agent, or Firm* — Oliff PLC

(57) ABSTRACT

An image processing apparatus includes a processor configured to: acquire a read image of a document that is read by a document reading apparatus; and control an image output device such that the read image and an additional image are outputted to a medium with a significance portion and the additional image prevented from overlapping, and a length of the medium in a sub scanning direction is increased in a case where the significance portion of the read image and a specified region of the read image to which the additional image is decided to be added overlap.

14 Claims, 21 Drawing Sheets

FIG. 19

| PROCESS ID | PROCESS TYPE | PROCESS STATUS | START TIME | FINISH TIME | ... | DATA WIDTH | DATA LENGTH | OUTPUT WIDTH | OUTPUT AMOUNT | OUTPUT TIME | ROLL LENGTH | ANNOTATION |
|---|---|---|---|---|---|---|---|---|---|---|---|---|
| 20974 | PRINT | FINISH | 6/13/2021 3:40 | 6/13/2021 3:42 | | 841 | 594 | 841 | 594 | 6/13/2021 3:42 | 594 | PRESENT |
| 20975 | PRINT | FINISH | 6/13/2021 3:40 | 6/13/2021 3:42 | | 841 | 594 | 841 | 594 | 6/13/2021 3:42 | 594 | PRESENT |
| 20976 | PRINT | FINISH | 6/13/2021 3:40 | 6/13/2021 3:42 | | 841 | 594 | 841 | 594 | 6/13/2021 3:42 | 594 | ABSENT |
| 20977 | PRINT | FINISH | 6/13/2021 3:40 | 6/13/2021 3:42 | | 841 | 594 | 841 | 594 | 6/13/2021 3:42 | 594 | ABSENT |
| 20978 | PRINT | FINISH | 6/13/2021 3:40 | 6/13/2021 3:42 | | 841 | 594 | 841 | 604 | 6/13/2021 3:42 | 604 | PRESENT (EXTENDED) |
| 20979 | PRINT | FINISH | 6/13/2021 3:40 | 6/13/2021 3:42 | | 841 | 594 | 841 | 594 | 6/13/2021 3:42 | 594 | PRESENT |
| 20980 | PRINT | FINISH | 6/13/2021 3:40 | 6/13/2021 3:42 | | 841 | 594 | 841 | 594 | 6/13/2021 3:42 | 594 | PRESENT |
| 20981 | PRINT | FINISH | 6/13/2021 3:40 | 6/13/2021 3:43 | | 841 | 594 | 841 | 594 | 6/13/2021 3:43 | 594 | ABSENT |
| 20982 | PRINT | FINISH | 6/13/2021 3:40 | 6/13/2021 3:43 | | 841 | 594 | 841 | 594 | 6/13/2021 3:43 | 594 | ABSENT |
| 20983 | PRINT | FINISH | 6/13/2021 3:40 | 6/13/2021 3:43 | | 841 | 594 | 841 | 604 | 6/13/2021 3:43 | 604 | PRESENT (EXTENDED) |

IMAGE PROCESSING APPARATUS, NON-TRANSITORY COMPUTER READABLE MEDIUM, AND METHOD

CROSS-REFERENCE TO RELATED APPLICATIONS

This application is based on and claims priority under 35 USC 119 from Japanese Patent Application No. 2022-049026 filed Mar. 24, 2022.

BACKGROUND

(i) Technical Field

The present disclosure relates to an image processing apparatus, a non-transitory computer readable medium, and a method.

(ii) Related Art

Japanese Unexamined Patent Application Publication No. 2009-223696 discloses an information processing apparatus including a writer unit that writes information about a print paper size larger than the page size of document data as annotation information in the document data, a reader unit that reads the written information about the print paper size, and an instruction unit that specifies the paper size during printing, based on the read information about the print paper size and that instructs generation of the print image of the document data that contains the annotation information.

Japanese Unexamined Patent Application Publication No. 2009-223738 discloses an information processing apparatus including a storage unit that stores document data that includes a document data body that contains a described content and annotation paper data that contains annotation information about the described content, a paper information determination unit that determines whether the annotation paper data is present or absent, and a display processing unit that generates drawing data for a display corresponding to annotation paper from the annotation paper data, that generates drawing data for a display corresponding to document paper from the document data body if the paper information determination unit determines that the annotation paper data is present, that arranges the document paper in the annotation paper, and that causes a display unit to display the annotation paper and the document paper.

SUMMARY

In some cases where a read image of a document that is read by a document reading apparatus and an additional image that is added to the read image are outputted to a medium, the read image and the additional image overlap, and the readability of each image is consequently reduced. In these cases, if the medium is changed into a medium that is sized in advance such that the read image and the additional image are containable, and the read image and the additional image are outputted, each medium is not extended by a freely determined length in a sub scanning direction, and this results in a waste of the medium.

Aspects of non-limiting embodiments of the present disclosure relate to inhibition about the occurrence of a waste of a medium and inhibition about a reduction in the readability of images with the result that a read image and an additional image overlap when the read image of a document that is read by a document reading apparatus and the additional image that is added to the read image are outputted to the medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor configured to: acquire a read image of a document that is read by a document reading apparatus; and control an image output device such that the read image and an additional image are outputted to a medium with a significance portion and the additional image prevented from overlapping, and a length of the medium in a sub scanning direction is increased in a case where the significance portion of the read image and a specified region of the read image to which the additional image is decided to be added overlap.

BRIEF DESCRIPTION OF THE DRAWINGS

An exemplary embodiment of the present disclosure will be described in detail based on the following figures, wherein:

FIG. 19 illustrates an example of a process history in which it is recorded that copy paper is extended.

DETAILED DESCRIPTION

An exemplary embodiment of the present disclosure will hereinafter be described in detail with reference to the attached drawings.

Summary of Present Exemplary Embodiment

According to the present exemplary embodiment, an image processing apparatus acquires a read image of a document that is read by a document reading apparatus and controls an image output device such that the read image and an additional image are outputted to a medium with a significance portion and the additional image prevented from overlapping, and a length of the medium in a sub scanning direction is increased in a case where the significance portion of the read image and a specified region of the read image to which the additional image is decided to be added overlap.

The significance portion of the read image described herein is a portion of the read image for reporting meaningful information to a user. The portion for reporting the meaningful information may be the entire portion except for the color of a foundation or may be a portion that has a size equal to or more than a threshold with the result that pixels for colors other than the color of the foundation are coupled with each other. The portion for reporting the meaningful information may be a predetermined kind of part in such a portion. Examples of the predetermined kind of part include a part on which a character image is formed and a part on which a photographic image is formed. In the following description, the significance portion of the read image is an effective image.

The additional image is added to image data. In the following description, an annotation image is taken as an example of the additional image. However, this is not a limitation, and the image may contain any information.

The medium is an object that is used to report information, and the image data is outputted thereto. Examples of the medium include paper and a plastic sheet. In the following description, paper is taken as an example.

To increase the length of the medium is to increase the length of the medium by changing a position at which the medium is cut.

Entire Configuration of Copy System

Figure 1:
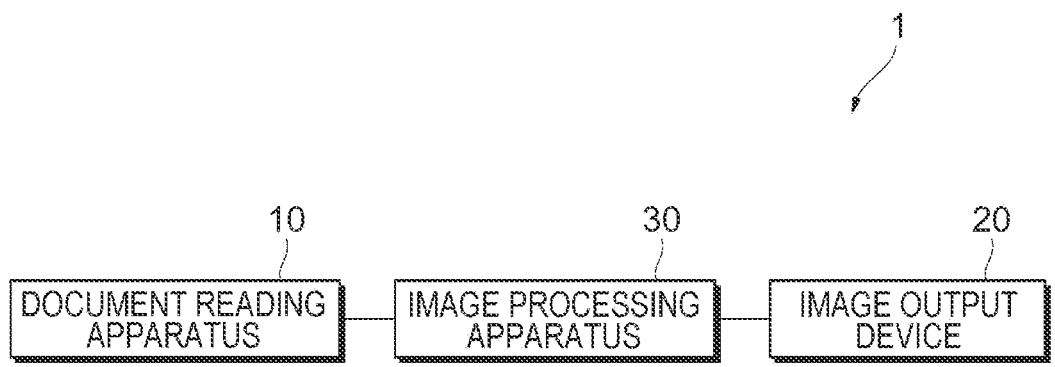
FIG. 1 is a block diagram illustrating an example of the entire configuration of a copy system according to the exemplary embodiment of the present disclosure.

FIG. 1 is a block diagram illustrating an example of the entire configuration of a copy system 1 according to the present exemplary embodiment. The copy system 1 includes a document reading apparatus 10, an image output device 20, and an image processing apparatus 30 as illustrated. The document reading apparatus 10 reads a document and outputs the image data thereof. The image output device 20 transfers an image to paper, based on the image data and discharges the paper. The image processing apparatus 30 acquires the image data from the document reading apparatus 10 and processes the image data for an output to the image output device 20. The copy system 1 is capable of making a synchronous cutting copy. The synchronous cutting copy is a copy acquired in a manner in which copy paper is cut so as to be suitable for the length of the document.

Hardware Configuration of Document Reading Apparatus

Figure 2:
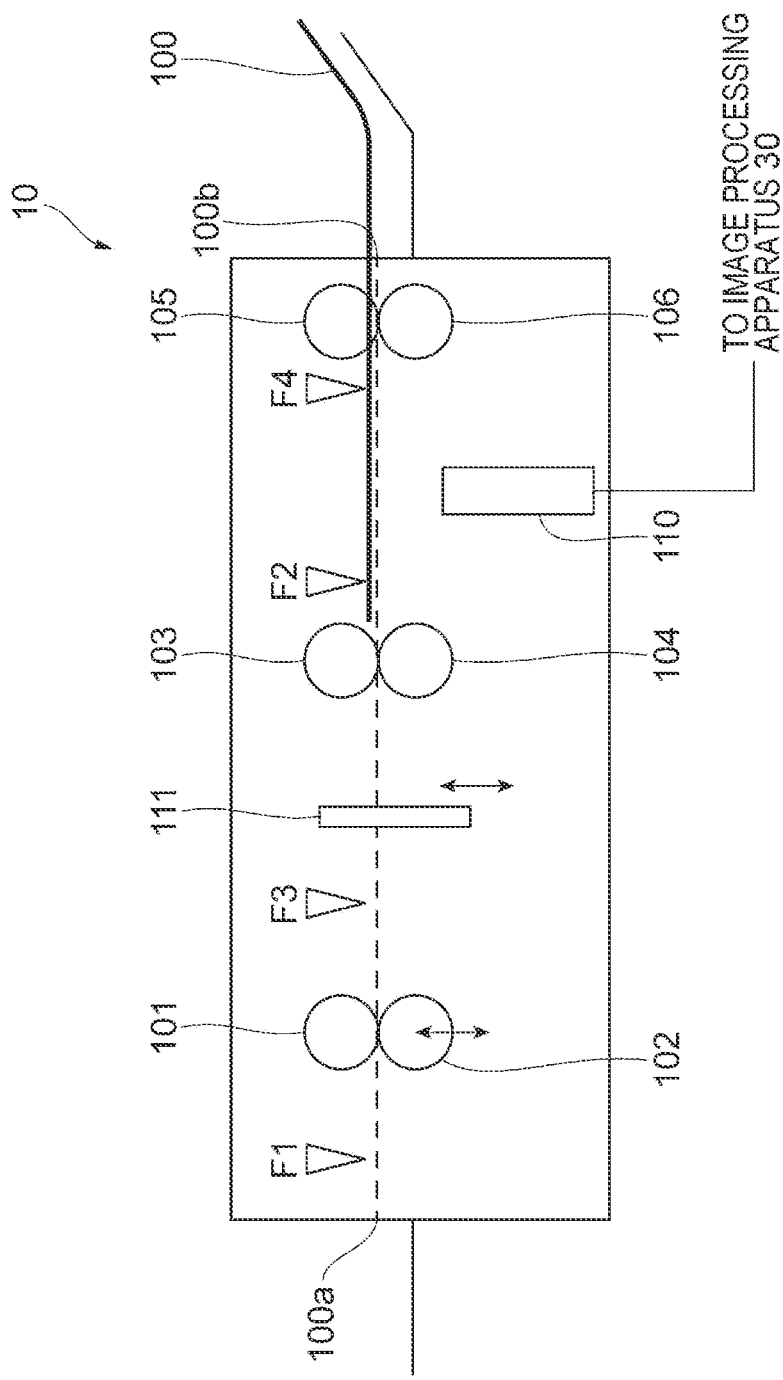
FIG. 2 illustrates an example of the hardware configuration of a document reading apparatus according to the exemplary embodiment of the present disclosure.

FIG. 2 illustrates an example of the hardware configuration of the document reading apparatus 10 according to the present exemplary embodiment.

In the document reading apparatus 10, transport rollers 101 to 106 for transporting a document 100 in a transport direction are disposed. As for the transport rollers 101 to 106, two rollers that are arranged in the vertical direction in FIG. 2 are paired for three transport units in total. The document 100 enters via a document entrance 100a, is transported by the transport rollers 101 and 102 corresponding to the first transport units, the transport rollers 103 and 104 corresponding to the second transport units, and the transport rollers 105 and 106 corresponding to the third transport units in turn, and is discharged via a document exit 100b.

A reading sensor 110 is disposed between the transport rollers 103 and 104 corresponding to the second transport units and the transport rollers 105 and 106 corresponding to the third transport units. The reading sensor 110 is a one-dimensional sensor that is acquired by arranging a large number of light detection sensors in a direction perpendicular to the transport direction of the document 100. The light detection sensors detect reflection light from a surface of the document 100. The output signals of the light detection sensors are sequentially scanned in a predetermined period and sequentially converted into digital signals. Consequently, the image data of a straight portion that is included in the entire image on the surface of the document 100 and that faces the light detection sensors is generated. The image data is continuously generated while the document 100 is transported, and the image data that represents the image on the surface of the document 100 is consequently generated. The image data that is acquired by the reading sensor 110 is transmitted to the image processing apparatus 30.

Sensors F1 to F4 for detecting edge portions of the document 100 that pass are disposed at points on a transport path for the document 100. A gate 111 is disposed between the transport rollers 101 and 102 corresponding to the first transport units and the transport rollers 103 and 104 corresponding to the second transport units. The gate 111 opens only while the reading sensor 110 reads the document 100 and allows the document 100 to pass toward the second transport units.

Hardware Configuration of Image Output Device

Figure 3:
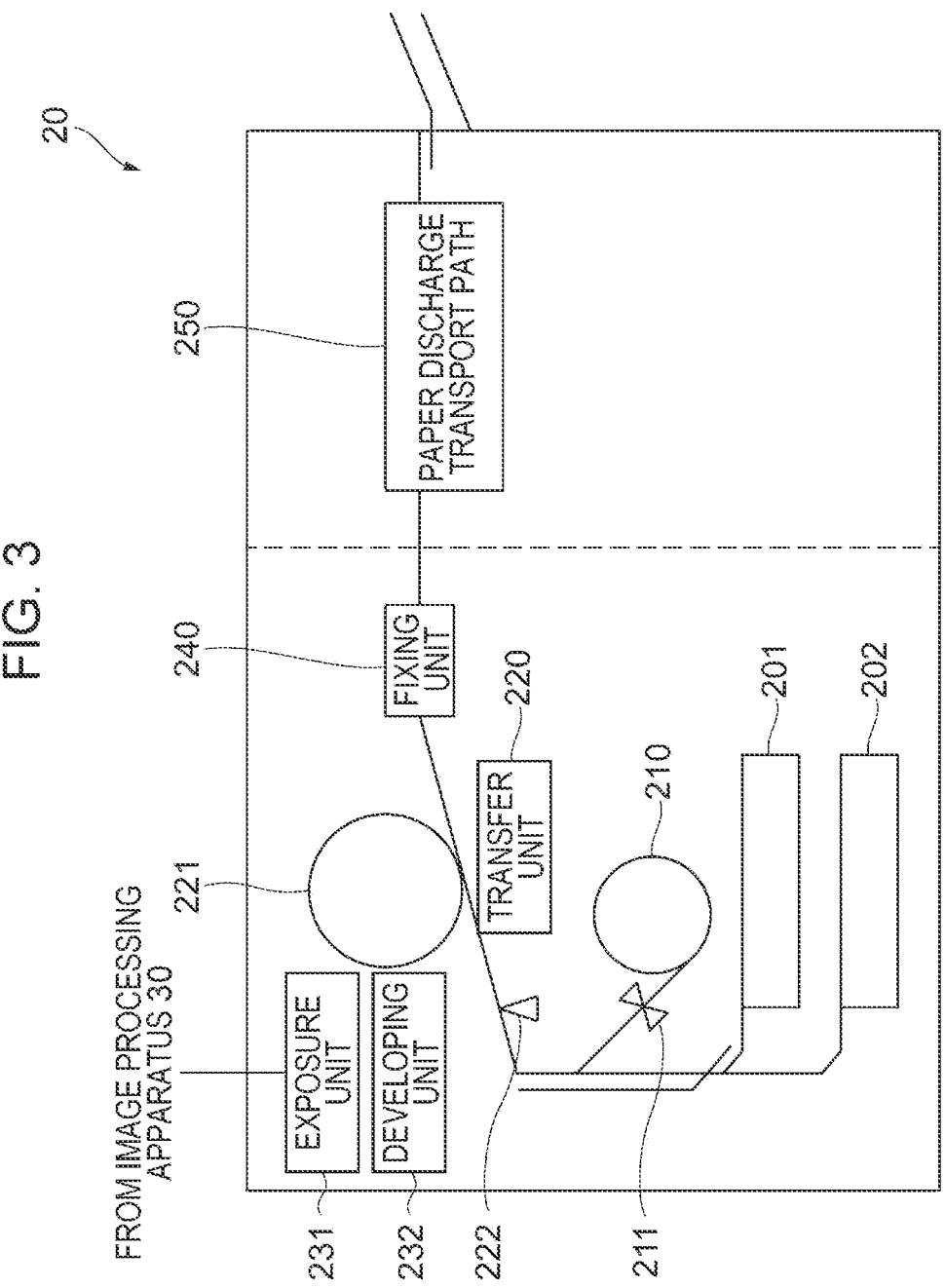
FIG. 3 illustrates an example of the hardware configuration of an image output device according to the exemplary embodiment of the present disclosure.

FIG. 3 illustrates an example of the hardware configuration of the image output device 20 according to the present exemplary embodiment.

The image output device 20 includes cut paper supplying units 201 and 202 and a roll paper supplying unit 210 as illustrated. The image output device 20 also includes a cutter 211 for cutting copy paper that is fed from the roll paper supplying unit 210. Copy paper in the cut paper supplying units 201 and 202 or the copy paper that is wound around the roll paper supplying unit 210 is selected for copying, based on an operation of the user. The selected copy paper is transported to a transfer unit 220 in response to an instruction for outputting from the image processing apparatus 30. A resist sensor 222 that detects the copy paper that comes is disposed in front of the transfer unit 220. An exposure unit 231 exposes the surface of a transfer drum 221 that rotates at a predetermined speed to light, based on the image data that is supplied from the image processing apparatus 30 and forms a latent image depending on the image data. A developing unit 232 supplies toner to the surface of the transfer drum 221 on which the latent image is thus formed and forms a toner image depending on the image data on the surface of the transfer drum 221. The transfer unit 220 presses the copy paper against the surface of the transfer drum 221 and transfers the toner image on the surface of the transfer drum 221 to the copy paper. The copy paper to which the toner image is thus transferred is subjected to a fixing process by a fixing unit 240 and is subsequently discharged via a paper discharge transport path 250.

Hardware Configuration of Image Processing Apparatus

Figure 4:
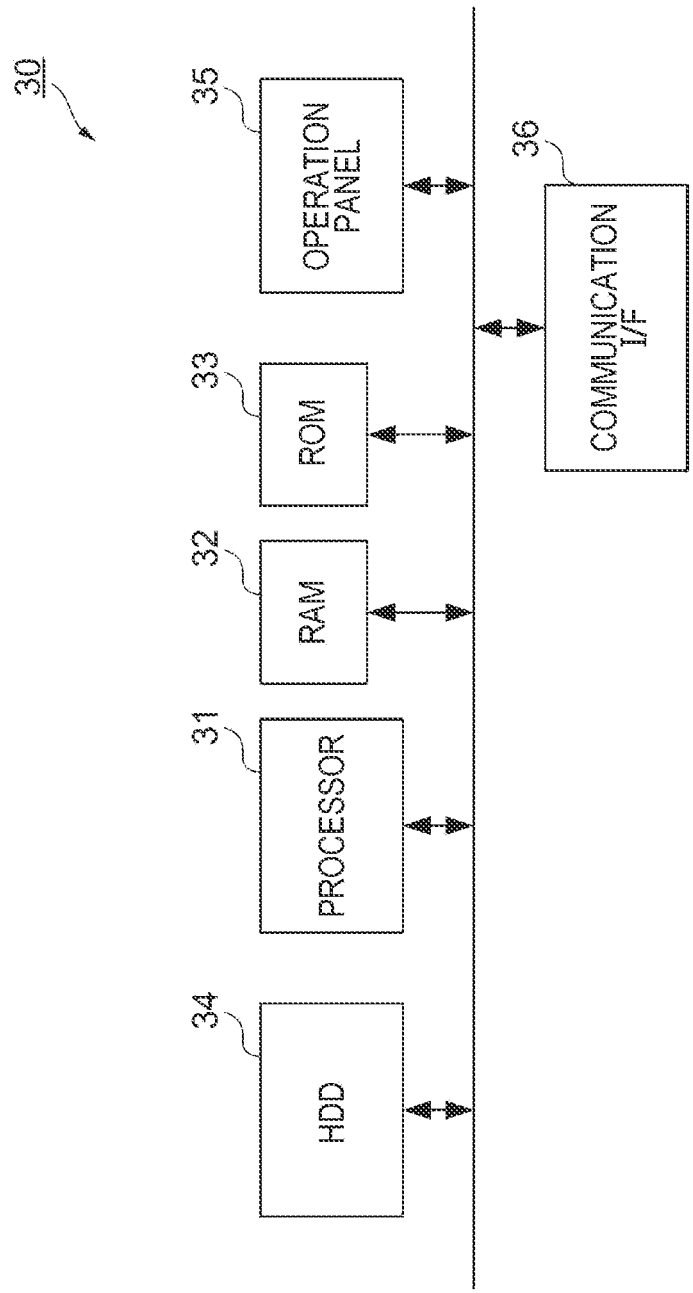
FIG. 4 illustrates an example of the hardware configuration of an image processing apparatus according to the exemplary embodiment of the present disclosure.
Figure 5:
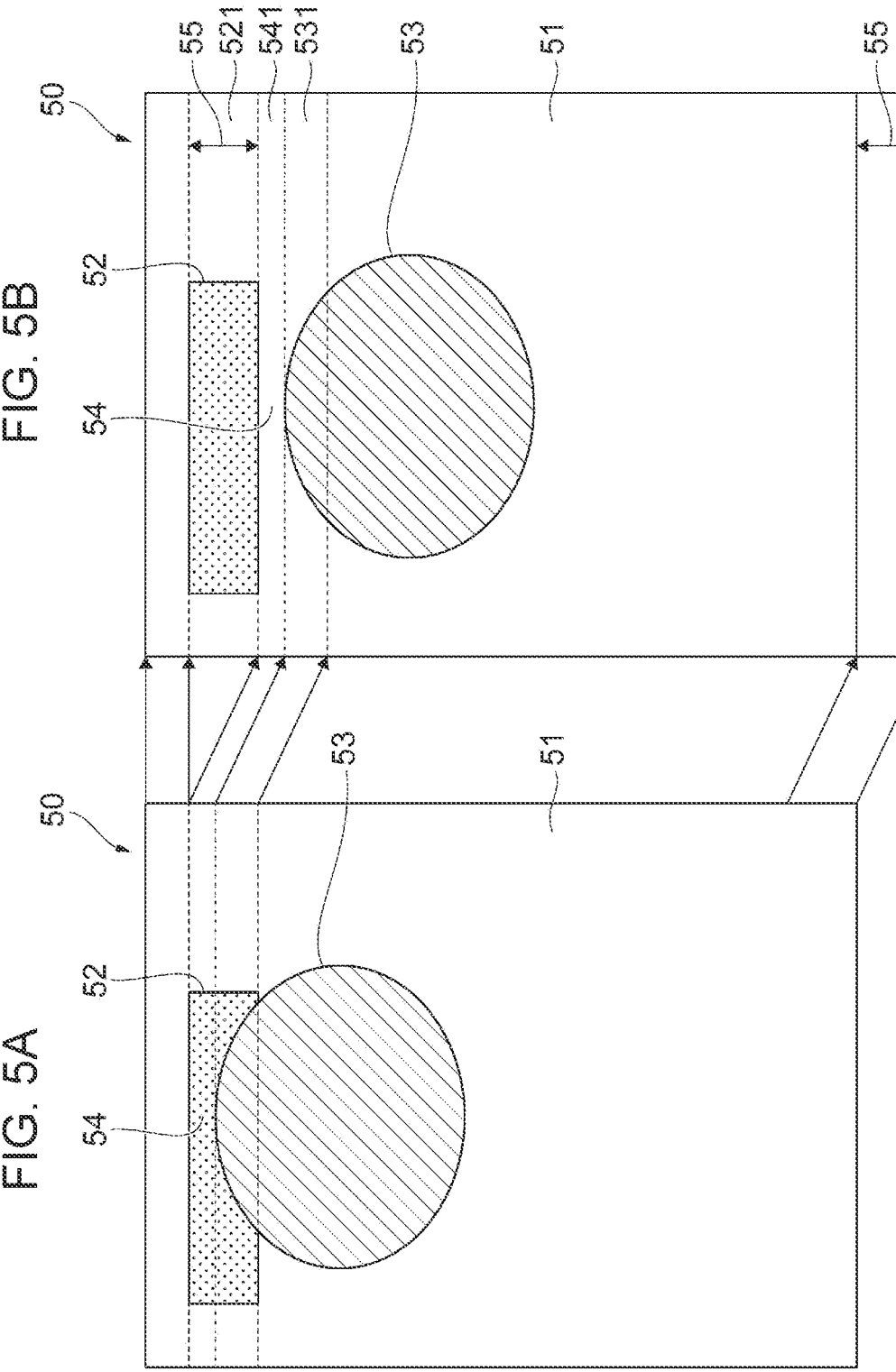
FIG. 5A and FIG. 5B illustrate a first example of compositing in the case where an effective image in a read image of a document and an annotation image overlap.

FIG. 4 illustrates an example of the hardware configuration of the image processing apparatus 30 according to the present exemplary embodiment. The image processing apparatus 30 includes a processor 31, a random access memory (RAM) 32, a read only memory (ROM) 33, a hard disk drive (HDD) 34, an operation panel 35, and a communication interface (referred to below as a "communication I/F") 36 as illustrated.

The processor 31 loads various programs that are stored in, for example, the ROM 33 into the RAM 32 and runs the programs to perform the functions of the image processing apparatus 30 described later.

The RAM 32 is a memory that is used, for example, as a work memory for the processor 31.

The ROM 33 is a memory that stores, for example, the various programs that are run by the processor 31.

The HDD 34 stores, for example, the image data that is acquired by reading the document by using the document reading apparatus 10, and an example thereof is a magnetic disk device.

The operation panel 35 displays various kinds of information and receives an operation input from the user, and an example thereof is a touch screen. The operation panel 35 includes a display that displays various kinds of information and a position detecting sheet that detects a position that is specified by a finger or an instruction unit such as a stylus pen. A display and a keyboard may be used instead of the touch screen.

The communication I/F 36 transmits and receives various kinds of information to and from another device via a communication line not illustrated.

Summary of Operation of Copy System

FIG. 5A to FIG. 8B illustrate examples of compositing a read image 51 of the document that is read by the document reading apparatus 10 and an annotation image 52 that is an example of the additional image on copy paper 50 that is outputted by the image output device 20.

FIG. 5A and FIG. 5B illustrate a first example of compositing in the case where an effective image 53 in the read image 51 of the document and the annotation image 52 overlap. As illustrated in FIG. 5A, a portion of the effective image 53 near a leading edge and the annotation image 52 overlap. In this case, as illustrated in FIG. 5B, a white line 521 is first formed on the copy paper 50 and is composited with the annotation image 52, and an image line that contains a portion of the read image 51 that overlaps the annotation image 52 is subsequently formed. The portion of the read image 51 that overlaps the annotation image 52 includes the portion of the effective image 53 near the leading edge and a white portion 54 that does not contain the effective image 53. Accordingly, image lines that are formed in the first example include an image line 541 that contains the white portion 54 and an image line 531 that contains the portion of the effective image 53 near the leading edge. As a result, as illustrated by using arrows 55, the copy paper 50 is extended not only by a length for the image line 531 that contains the portion of the effective image 53 near the leading edge but also by a length for the image line 541 that contains the white portion 54.

FIG. 6A and FIG. 6B illustrate a second example of compositing in the case where the effective image 53 in the read image 51 of the document and the annotation image 52 overlap. As illustrated in FIG. 6A, the portion of the effective image 53 near the leading edge and the annotation image 52 overlap. In this case, as illustrated in FIG. 6B, the white line 521 is first formed on the copy paper 50 and is composited with the annotation image 52, and the image line that contains the portion of the read image 51 that overlaps the annotation image 52 is subsequently formed. The portion of the read image 51 that overlaps the annotation image 52 includes the portion of the effective image 53 near the leading edge and the white portion 54 that does not contain the effective image 53. An image line that is formed in the second example, however, is the image line 531 that contains the portion of the effective image 53 near the leading edge, but the image line that contains the white portion 54 is not formed. As a result, as illustrated by using arrows 56, the copy paper 50 is extended only by a length for the image line 531 that contains the portion of the effective image 53 near the leading edge.

Examples of a method of specifying the position of the annotation image 52 when the read image 51 and the annotation image 52 are composited include a paper leading edge base point specifying method of specifying the position by using an offset from the paper leading edge and a paper trailing edge base point specifying method of specifying the position by using an offset from a paper trailing edge. In the paper leading edge base point specifying method, the annotation image 52 is composited while the offset from the paper leading edge is maintained, and this is convenient. In the paper trailing edge base point specifying method, the annotation image 52 is composited while the offset from the paper trailing edge is maintained, and this is convenient. FIG. 5A, FIG. 5B, FIG. 6A, and FIG. 6B do not illustrate whether the annotation image 52 is composited while the offset from the paper leading edge is maintained or while the offset from the paper trailing edge is maintained. Accordingly, the case of extension by the length for the image line 541 that contains the white portion 54 as illustrated in FIG. 5A and FIG. 5B is taken as an example here, and the case where the annotation image 52 is composited while the offset from the paper leading edge is maintained and the case where the annotation image 52 is composited while the offset from the paper trailing edge is maintained will now be described.

FIG. 7A and FIG. 7B illustrate an example of compositing for maintaining the offset of the annotation image 52 from the paper leading edge in the case where the effective image 53 in the read image 51 of the document and the annotation image 52 overlap. As illustrated in FIG. 7A, a portion of the effective image 53 near the trailing edge and the annotation image 52 overlap. In this case, as illustrated in FIG. 7B, the white line 521 is first formed on the copy paper 50 and is composited with the annotation image 52, and an image line that contains a portion of the read image 51 that overlaps the annotation image 52 is subsequently formed. As illustrated by an arrow 57, the read image 51 and the annotation image 52 are formed in this order to maintain the offset of the annotation image 52 from the paper leading edge. The portion of the read image 51 that overlaps the annotation image 52 includes the portion of the effective image 53 near the trailing edge and the white portion 54 that does not contain the effective image 53. Accordingly, image lines that are formed in this example include the image line 541 that contains the white portion 54 and the image line 531 that contains the portion of the effective image 53 near the trailing edge. As a result, as illustrated by the arrows 55, the copy paper 50 is extended not only by a length for the image line 531 that contains the portion of the effective image 53 near the trailing edge but also by a length for the image line 541 that contains the white portion 54.

FIG. 8A and FIG. 8B illustrate an example of compositing for maintaining the offset of the annotation image 52 from the paper trailing edge in the case where the effective image 53 in the read image 51 of the document and the annotation image 52 overlap. As illustrated in FIG. 8A, the portion of the effective image 53 near the trailing edge and the annotation image 52 overlap. In this case, as illustrated in FIG. 8B, the image line that contains the portion of the read image 51 that overlaps the annotation image 52 is first formed on the copy paper 50, and the white line 521 is subsequently formed and is composited with the annotation image 52. As illustrated in an arrow 58, the read image 51 and the annotation image 52 are formed in this order to maintain the offset of the annotation image 52 from the paper trailing edge. The portion of the read image 51 that overlaps the annotation image 52 includes the portion of the effective image 53 near the trailing edge and the white portion 54 that does not contain the effective image 53. Accordingly, image lines that are formed in this example include the image line 541 that contains the white portion 54 and the image line 531 that contains the portion of the effective image 53 near the trailing edge. As a result, as illustrated by the arrows 55, the copy paper 50 is extended not only by the length for the image line 531 that contains the portion of the effective image 53 near the trailing edge but also by the length for the image line 541 that contains the white portion 54.

In the case where the document reading apparatus 10 reads the document while the image output device 20 outputs the image according to the present exemplary embodiment, the image processing apparatus 30 reads the image data from the document reading apparatus 10 and calculates an outputting start timing with which the image is transferred to the copy paper.

FIG. 9 to FIG. 14 are graphs illustrating the outputting start timing. In these graphs, the horizontal axis represents a time, the vertical axis represents the position of the document, a straight line 60 represents reading, and a straight line 61 represents outputting. In the graphs, an annotation region near the paper trailing edge is illustrated by dot hatching. In the graphs, T, Ta, T2, and T3 are used to represent the time but are also used to represent an elapsed time after a reading start timing because the reading start timing is set to 0.

Figure 9:
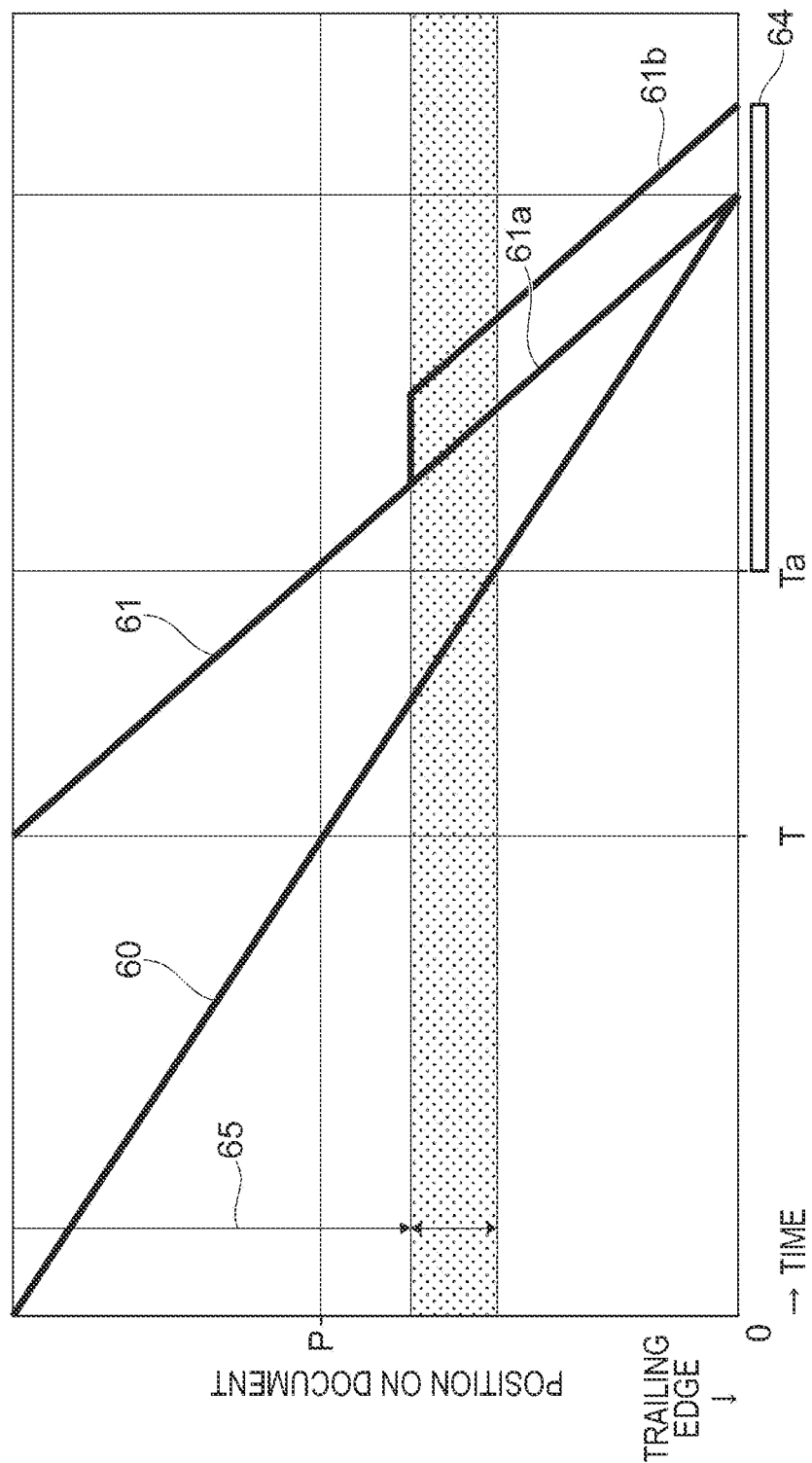
FIG. 9 is a graph illustrating a first example of an outputting start timing in the case of a paper leading edge base point specifying method.

FIG. 9 illustrates a first example of the outputting start timing in the case of the paper leading edge base point specifying method. An arrow 65 represents the paper leading edge base point specifying method.

In FIG. 9, the image processing apparatus 30 delays the outputting start timing so as to finish reading a document that has a predetermined maximum document length and finish outputting at the same time in the case where reading and outputting are simultaneously progressed. Specifically, the image processing apparatus 30 transmits the outputting start timing to the image output device 20. The outputting start timing is a timing after the reading start timing with which the document reading apparatus 10 starts to read the image data and after a print delay time T has elapsed. The print delay time T is a time in consideration of a difference between a reading speed corresponding to an example of a first speed of the document reading apparatus 10 and an outputting speed corresponding to an example of a second speed of the image output device 20.

In the first example, a position P on the document to be printed does not reach the annotation region at a time Ta at which investigation of whether the annotation region overlaps the effective image is finished. That is, the annotation region does not start to be printed when the investigation of whether the annotation region overlaps the effective image is finished, and accordingly, it is not necessary to change the outputting start timing.

In FIG. 9, a straight line 61a represents the trajectory of a print position in the case where whether the annotation region overlaps the effective image is investigated, and consequently, the paper is not extended because the annotation region does not overlap the effective image. A straight line 61b represents the trajectory of the print position in the case where whether the annotation region overlaps the effective image is investigated, and consequently, the paper is extended because the annotation region overlaps the effective image. A straight line 64 represents a period in which a UI for the user to determine whether the paper is extended is displayed.

Figure 10:
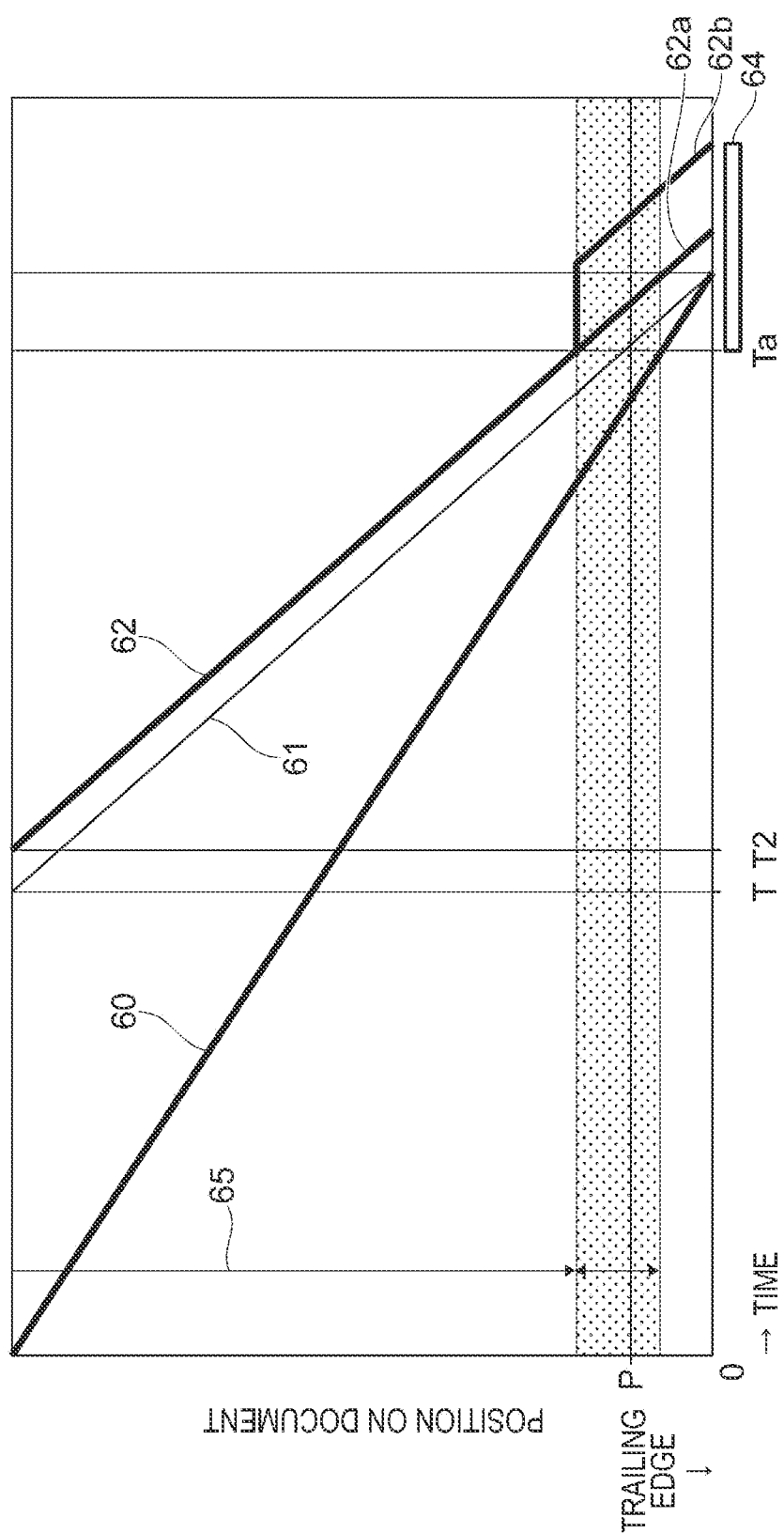
FIG. 10 is a graph illustrating a second example of the outputting start timing in the case of the paper leading edge base point specifying method.

FIG. 10 illustrates a second example of the outputting start timing in the case of the paper leading edge base point specifying method. The arrow 65 represents the paper leading edge base point specifying method.

In FIG. 10, the image processing apparatus 30 delays the outputting start timing by the print delay time T so as to finish reading the document that has the predetermined maximum document length and finish outputting at the same time in the case where reading and outputting are simultaneously progressed as in FIG. 9.

In the second example, however, the position P on the document reaches the annotation region at the time Ta at which investigation of whether the annotation region overlaps the effective image is finished. That is, the annotation region starts to be printed before the investigation of whether the annotation region overlaps the effective image is finished. Accordingly, the straight line that represents outputting is changed into a straight line 62, and the outputting start timing is delayed until a time T2.

In FIG. 10, a straight line 62a represents the trajectory of the print position in the case where whether the annotation region overlaps the effective image is investigated, and consequently, the paper is not extended because the annotation region does not overlap the effective image. A straight line 62b represents the trajectory of the print position in the case where whether the annotation region overlaps the effective image is investigated, and consequently, the paper is extended because the annotation region overlaps the effective image. The straight line 64 represents the period in which the UI for the user to determine whether the paper is extended is displayed.

Figure 11:
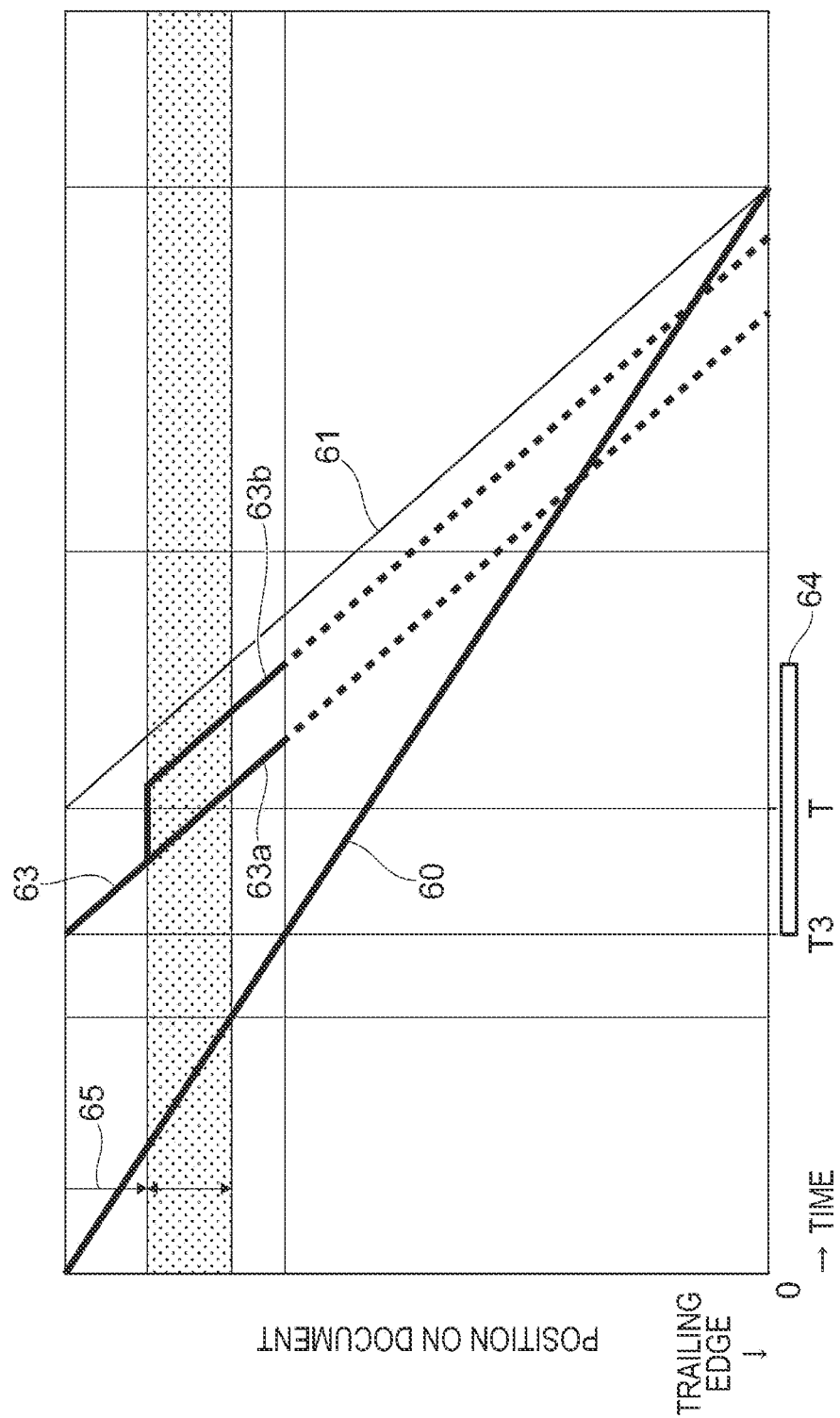
FIG. 11 is a graph illustrating a third example of the outputting start timing in the case of the paper leading edge base point specifying method.

FIG. 11 illustrates a third example of the outputting start timing in the case of the paper leading edge base point specifying method. The arrow 65 represents the paper leading edge base point specifying method.

In FIG. 11, the image processing apparatus 30 delays the outputting start timing by the print delay time T so as to finish reading the document that has the predetermined maximum document length and finish outputting at the same time in the case where reading and outputting are simultaneously progressed as in FIG. 9.

In the third example, an actual document size is smaller than the maximum document size. In this case, when reading the document is finished, outputting may start because outputting is not finished earlier than reading. Accordingly, the straight line that represents outputting is changed into a straight line 63, and the outputting start timing is advanced into a time T3.

In FIG. 11, a straight line 63a represents the trajectory of the print position in the case where whether the annotation region overlaps the effective image is investigated, and consequently, the paper is not extended because the annotation region does not overlap the effective image. A straight line 63b represents the trajectory of the print position in the case where whether the annotation region overlaps the effective image is investigated, and consequently, the paper is extended because the annotation region overlaps the effective image. The straight line 64 represents the period in which the UI for the user to determine whether the paper is extended is displayed.

Even in some cases where the actual document size is smaller than the maximum document size, outputting starts when reading the document is finished. In these cases, the print delay time T is not advanced as in FIG. 9.

Figure 12:
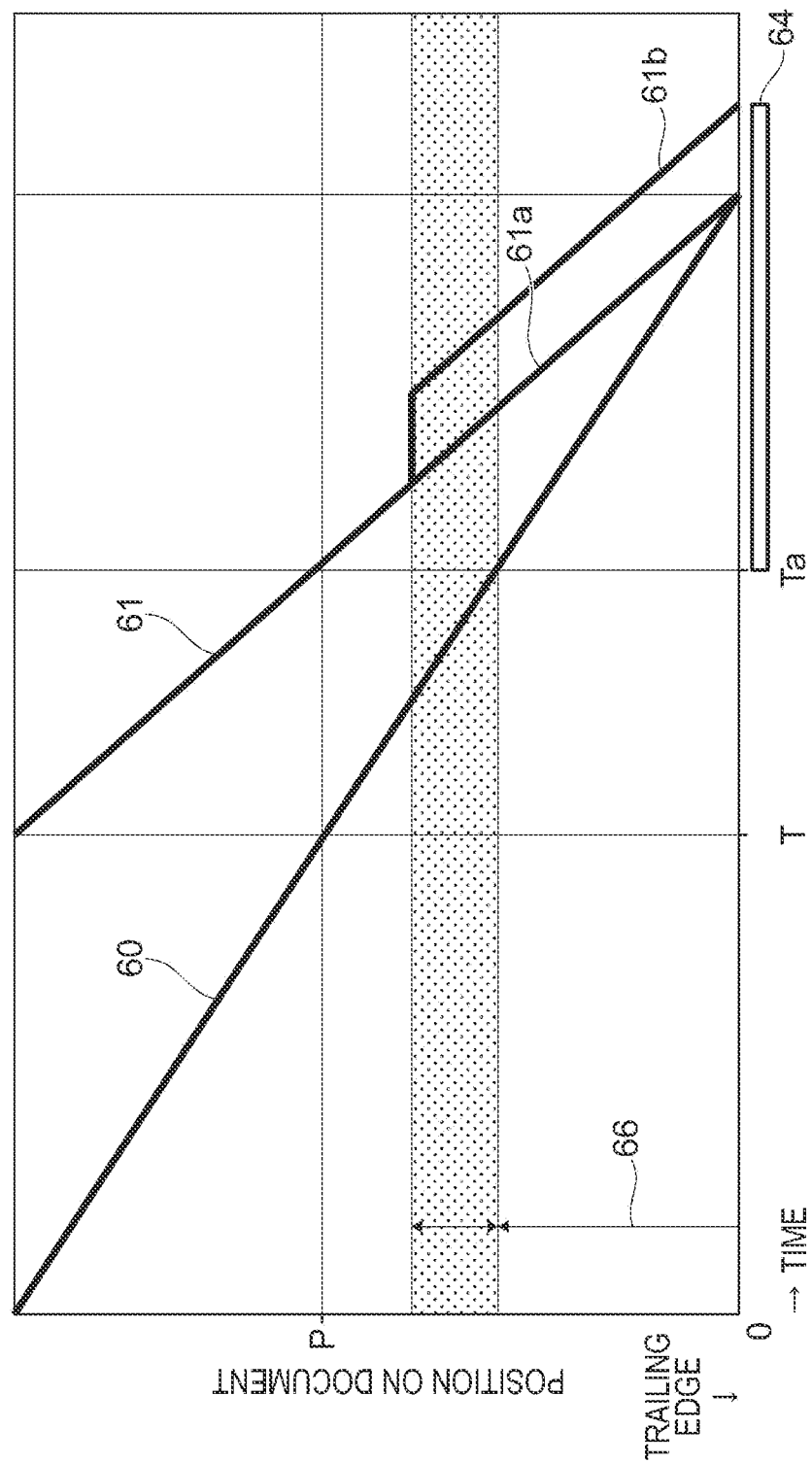
FIG. 12 is a graph illustrating a first example of the outputting start timing in the case of a paper trailing edge base point specifying method.

FIG. 12 illustrates a first example of the outputting start timing in the case of the paper trailing edge base point specifying method. An arrow 66 represents the paper trailing edge base point specifying method. FIG. 12 is the same as FIG. 9, and the description thereof is omitted here.

Figure 13:
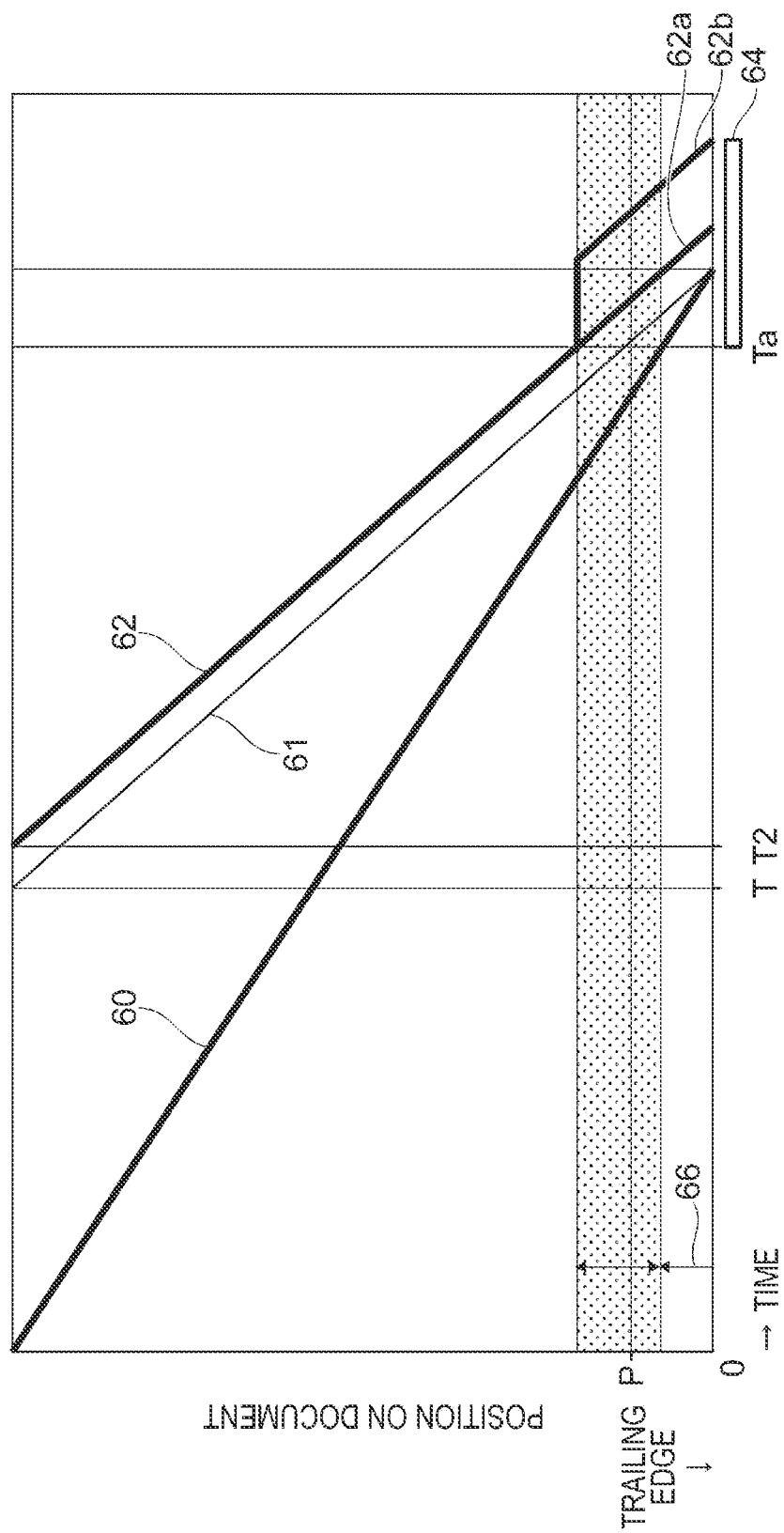
FIG. 13 is a graph illustrating a second example of the outputting start timing in the case of the paper trailing edge base point specifying method.

FIG. 13 illustrates a second example of the outputting start timing in the case of the paper trailing edge base point specifying method. The arrow 66 represents the paper trailing edge base point specifying method. FIG. 13 is the same as FIG. 10, and the description thereof is omitted here.

Figure 14:
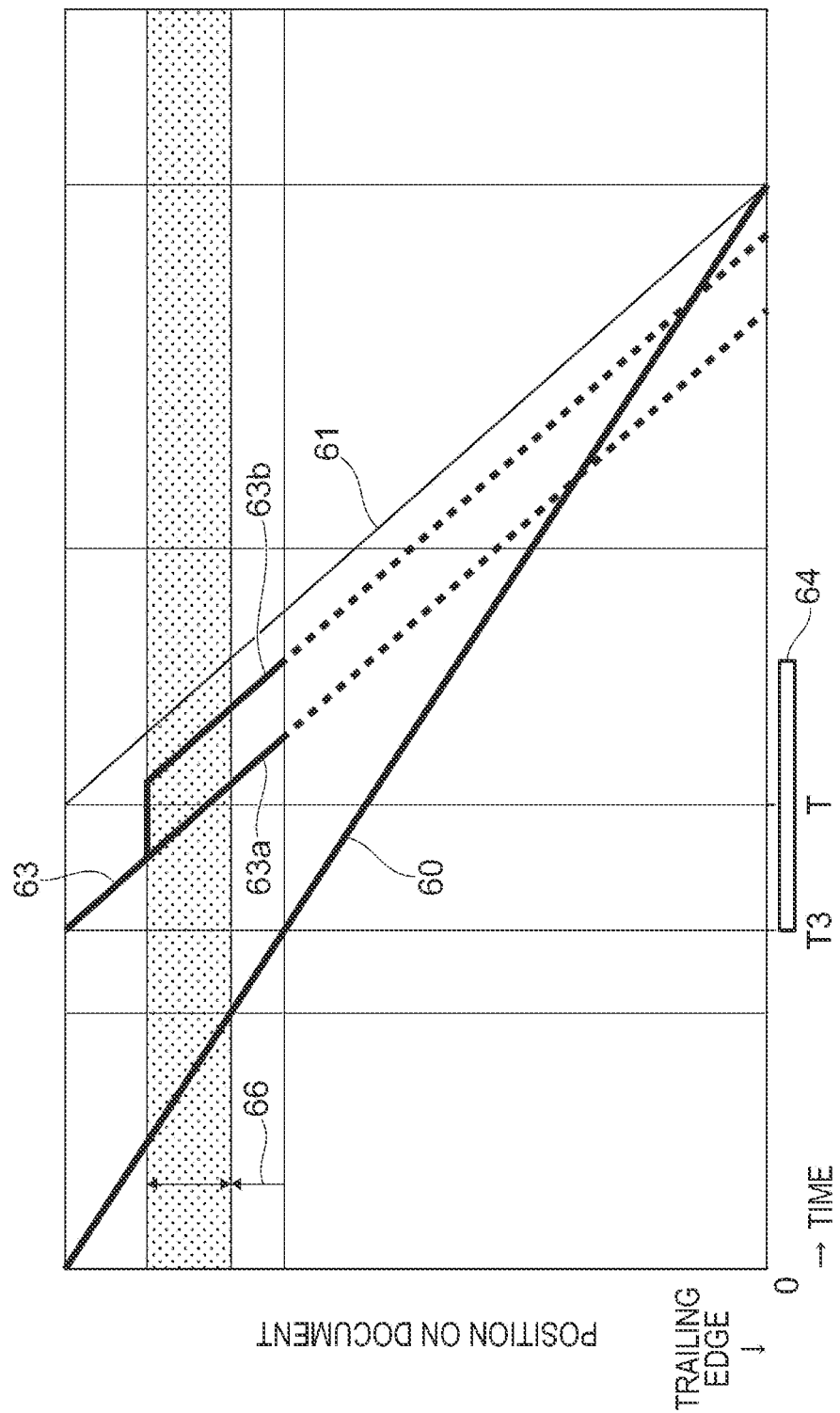
FIG. 14 is a graph illustrating a third example of the outputting start timing in the case of the paper trailing edge base point specifying method.

FIG. 14 illustrates a third example of the outputting start timing in the case of the paper trailing edge base point specifying method. The arrow 66 represents the paper trailing edge base point specifying method. FIG. 14 is the same as FIG. 11, and the description thereof is omitted here.

Figure 15:
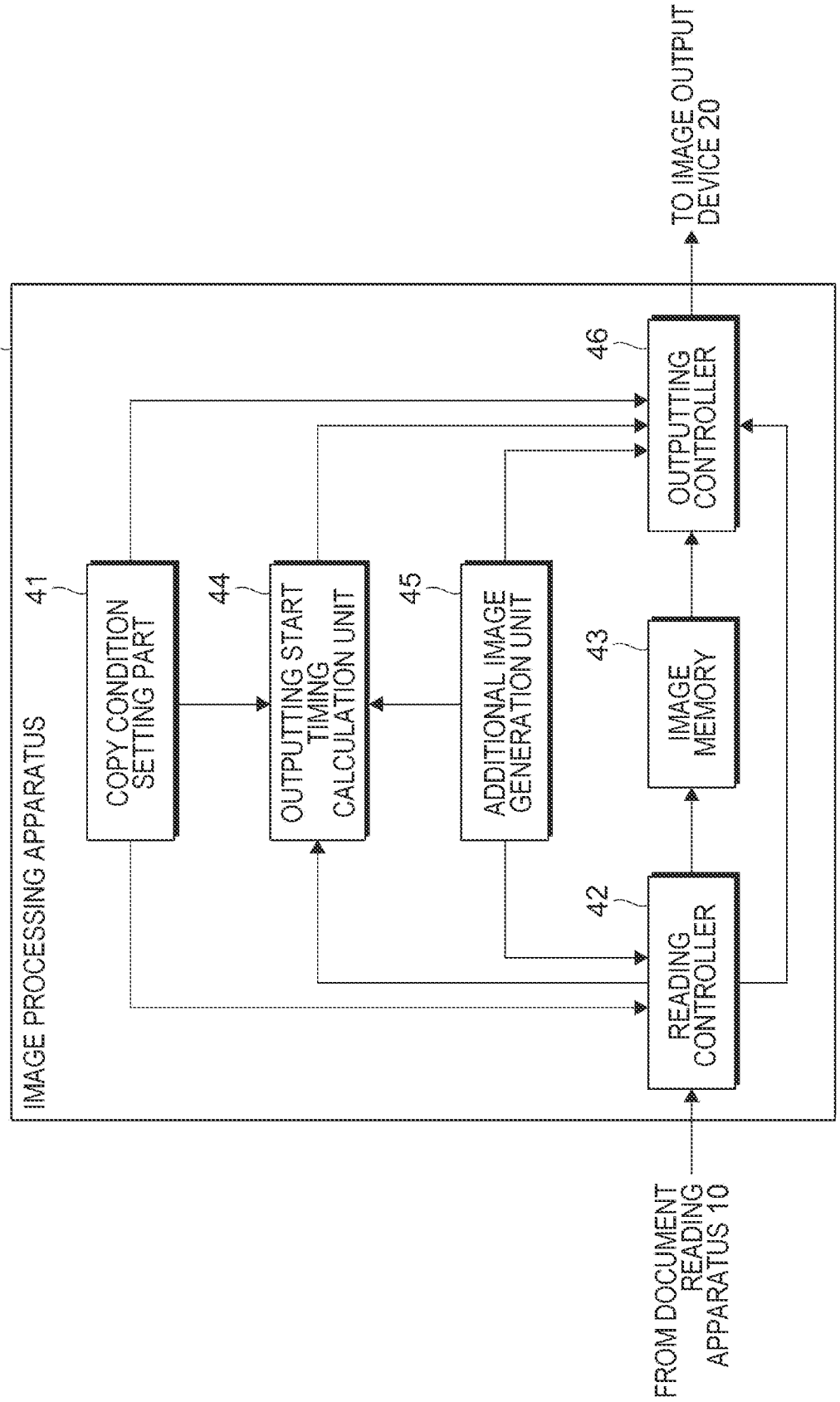
FIG. 15 is a block diagram illustrating an example of the functional configuration of the image processing apparatus according to the exemplary embodiment of the present disclosure.

Even in some cases where the actual document size is smaller than the maximum document size, outputting starts when reading the document is finished. In these cases, the print delay time T is not advanced as in FIG. 12. Functional Configuration of Image Processing Apparatus FIG. 15 is a block diagram illustrating an example of the functional configuration of the image processing apparatus 30 according to the present exemplary embodiment. The image processing apparatus 30 includes a copy condition setting part 41, a reading controller 42, an image memory 43, an outputting start timing calculation unit 44, an additional image generation unit 45, and an outputting controller 46 as illustrated.

The copy condition setting part 41 sets a copy condition that the user instructs on the operation panel 35. Examples of the copy condition include a selection from a fixed form copy and a synchronous cutting copy, magnification, paper, and an operation mode for the synchronous cutting copy. Examples of the copy condition also include the position of a composite region of the additional image. The position of the composite region of the additional image may be specified by using a base point on the composite region and an offset from the base point.

The reading controller 42 controls the document reading apparatus 10 that reads the document.

Specifically, the reading controller 42 determines whether a document is inserted via the document entrance 100a and acquires the entire storage area in the image memory 43 if it is determined that the document is inserted.

The reading controller 42 instructs the document reading apparatus 10 to read the document and acquires the image data that is transmitted from the document reading apparatus 10 in response to the instruction. The reading controller 42 causes the image memory 43 to store the acquired image data.

The reading controller 42 sets the cut length of the copy paper and requests cutting or sets the position of the additional image and requests compositing the additional image.

The reading controller 42 determines whether the effective image is located in the composite region of the additional image of the image data and transmits information about whether the effective image is located therein to the outputting controller 46.

According to the present exemplary embodiment, the reading controller 42 performs the process as an example of acquiring the read image of the document that is read by the document reading apparatus.

The image memory 43 stores the image data that the reading controller 42 reads from the document reading apparatus 10. An example of the image memory 43 is the HDD 34.

The outputting start timing calculation unit 44 acquires a print delay time T2 from the reading start timing until the outputting start timing if it is determined that reading and outputting are simultaneously progressed depending on the copy condition that is set by the copy condition setting part 41. Specifically, the outputting start timing calculation unit 44 acquires the print delay time T that is used to finish reading the document that has the predetermined maximum document length and finish outputting at the same time. When the position P on the document to be printed at the time Ta at which the trailing edge of the composite region of the additional image is read is nearer than the leading edge of the composite region of the additional image to the trailing edge, the outputting start timing calculation unit 44 changes the print delay time into T2 such that the leading edge of the composite region of the additional image is printed at the time Ta. The outputting start timing calculation unit 44 calculates the outputting start timing, based on the reading start timing and the print delay time T2 and transmits the calculated outputting start timing to the outputting controller 46.

According to the present exemplary embodiment, the print delay time T2 is used as an example of a wait time depending on the position of a specified region in the sub scanning direction. According to the present exemplary embodiment, the outputting start timing calculation unit 44 performs this process as an example in which the image output device is controlled such that the read image starts to be outputted to the medium after the document reading apparatus starts to read the document and after the wait time has elapsed.

When reading the document is finished, the outputting start timing calculation unit 44 determines whether the current time is earlier than the calculated outputting start timing and transmits the current time as a new outputting start timing to the outputting controller 46 if the current time is earlier than the calculated outputting start timing.

According to the present exemplary embodiment, the outputting start timing calculation unit 44 performs this process as an example in which the image output device is controlled such that the read image starts to be outputted to the medium after reading is finished and before the wait time has elapsed in the case where reading is finished after the document reading apparatus starts to read the document and before the wait time has elapsed.

The additional image generation unit 45 generates the additional image. For example, the additional image generation unit 45 may generate the additional image, based on information about the user and information about date but is not limited thereto. The additional image generation unit 45 stores information about the height of the additional image, that is, the length of the additional image in the sub scanning direction.

The outputting controller 46 controls the image output device 20 that outputs the image data that is read from the image memory 43.

Specifically, the outputting controller 46 determines whether the reading controller 42 requests outputting and causes the image output device 20 to prepare the operation thereof if outputting is requested. The outputting controller 46 instructs the image output device 20 to start printing at a time acquired by subtracting a paper delay time Td from the outputting start timing that is transmitted from the outputting start timing calculation unit 44. The outputting controller 46 outputs the image data that is read from the image memory 43 to the image output device 20 after the instruction for starting printing in response to a request for transmitting the image data from the image output device 20.

The outputting controller 46 determines whether the print position of the image data reaches the composite region of the additional image and outputs the image data to the image output device 20 while compositing the additional image that is generated by the additional image generation unit 45 if the print position reaches the composite region of the additional image. Since the image starts to be transferred to the copy paper with the outputting start timing that is transmitted from the outputting start timing calculation unit 44, the print position of the image data reaches the composite region of the additional image after the reading controller 42 determines whether the effective image is located in the composite region of the additional image. That is, the outputting controller 46 outputs the data of the image with which the additional image is composited to the image output device 20 depending on the result of determination after the reading controller 42 determines whether the effective image is located in the composite region of the additional image.

If it is determined that the effective image is located in the composite region of the additional image, the outputting controller 46 outputs the image data that contains the additional image, a portion of the effective image that overlaps the composite region, and a portion of the effective image behind these in this order to the image output device 20. Alternatively, the outputting controller 46 may output the image data that contains the portion of the effective image that overlaps the composite region, the additional image, and the portion of the effective image behind these in this order to the image output device 20.

If it is determined that the effective image is not located in the composite region of the additional image, the outputting controller 46 outputs the image data that contains the additional image and a portion of the effective image behind the composite region in this order to the image output device 20. Alternatively, the outputting controller 46 may output the image data that includes data acquired by superimposing the additional image and the portion of the effective image that overlaps the composite region and data of a portion of the effective image behind these in this order to the image output device 20.

According to the present exemplary embodiment, the effective image is used as an example of the significance portion of the read image, and the composite region of the additional image is used as an example of the specified region of the read image to which the additional image is decided to be added. According to the present exemplary embodiment, the outputting controller 46 performs this process as an example in which the read image and the additional image are outputted to the medium such that the significance portion and the additional image do not overlap in the case where the significance portion and the specified region overlap.

According to the present exemplary embodiment, the outputting controller 46 performs this process as an example in which the image output device is controlled such that the additional image is outputted if the significance portion and the specified region overlap after the document reading apparatus finishes reading the specified region, and a part of the significance portion that overlaps the specified region is subsequently outputted.

According to the present exemplary embodiment, the outputting controller 46 performs this process as an example in which the image output device is controlled such that at least the additional image is outputted if the significance portion and the specified region do not overlap after the document reading apparatus finishes reading the specified region, and a part of the significance portion nearer than the specified region to the trailing edge in the sub scanning direction.

In some cases, the reading controller 42 determines whether the effective image is located in the composite region of the additional image, and consequently, it is revealed that a portion that overlaps the composite region of the additional image of the image data includes a white portion at which the effective image is not located.

In these cases, the outputting controller 46 may output the image data with which the additional image is composited to the image output device 20 together with the white portion.

For example, the outputting controller 46 may output an image line that contains the portion that overlaps the composite region of the additional image of the image data after an image line acquired by compositing the additional image with a white line is outputted and may subsequently output an image line that contains a portion of the image data behind these.

According to the present exemplary embodiment, the outputting controller 46 performs this process as an example in which the image output device is controlled such that a portion that overlaps the specified region of the read image is outputted after the additional image is outputted.

Alternatively, the outputting controller 46 may output the image line acquired by compositing the additional image with the white line after the image line that contains the portion that overlaps the composite region of the additional image of the image data is outputted and may subsequently output the image line that contains the portion of the image data behind these.

According to the present exemplary embodiment, the outputting controller 46 performs this process as an example in which the image output device is controlled such that the additional image is outputted after the portion that overlaps the specified region of the read image is outputted.

In this case, the outputting controller 46 may output the image data with which the additional image is composited to the image output device 20 without a white portion.

For example, the outputting controller 46 may output an image line that contains the portion of the effective image that overlaps the composite region of the additional image after the image line acquired by compositing the additional image with the white line is outputted and may subsequently output the image line that contains the portion of the image data behind these.

According to the present exemplary embodiment, the outputting controller 46 performs this process as an example in which the image output device is controlled such that the part of the significance portion that overlaps the specified region is outputted after the additional image is outputted.

Alternatively, the outputting controller 46 may output the image line acquired by compositing the additional image with the white line after the image line that contains the portion of the effective image that overlaps the composite region of the additional image and may subsequently output the image line that contains the portion of the image data behind these.

According to the present exemplary embodiment, the outputting controller 46 performs this process as an example in which the image output device is controlled such that the additional image is outputted after the part of the significance portion that overlaps the specified region is outputted.

The outputting controller 46 reads the cut length that is set by the reading controller 42 and transmits the cut length to the image output device 20. In the case where the portion that overlaps the composite region of the additional image of the image data is transmitted separately from the additional image, the outputting controller 46 transmits an instruction for increasing the cut length by the height of the portion that overlaps the composite region of the additional image of the image data to the image output device 20.

According to the present exemplary embodiment, the outputting controller 46 performs this process as an example in which the image output device is controlled such that the length of the medium in the sub scanning direction is increased in the case where the significance portion and the specified region overlap.

Also, in this case, the process of the outputting controller 46 is changed depending on whether the white portion that is included in the portion that overlaps the composite region of the additional image of the image data is outputted to the image output device 20.

In the case where the image data with which the additional image is composited is outputted to the image output device 20 together with the white portion, the outputting controller 46 transmits an instruction for increasing the cut length by the length of the portion that overlaps the composite region of the additional image of the image data to the image output device 20.

According to the present exemplary embodiment, the outputting controller 46 performs this process as an example in which the image output device is controlled such that the length of the medium in the sub scanning direction is increased by the length of the specified region in the sub scanning direction.

In the case where the image data with which the additional image is composited is outputted to the image output device 20 without the white portion, the outputting controller 46 transmits an instruction for increasing the cut length by the length of the portion of the effective image that overlaps the composite region of the additional image to the image output device 20.

According to the present exemplary embodiment, the outputting controller 46 performs this process as an example in which the image output device is controlled such that the length of the medium in the sub scanning direction is increased by the length of a part of the specified region that overlaps the significance portion in the sub scanning direction.

The outputting controller 46 transmits the image data from the image memory 43 to the image output device 20 only in a period in which a request for transmitting the image data is received and stops transmitting the image data when the request for transmitting ends. The outputting controller 46 releases the image memory 43.

In the case where the cut length of the copy paper is increased, the outputting controller 46 outputs information that represents that the length of the copy paper is longer than the original length. The outputting controller 46 may display the information on the operation panel 35 or may cause the HDD 34 to store the information as a process history.

According to the present exemplary embodiment, the outputting controller 46 performs this process as an example in which information that represents that the length of the medium in the sub scanning direction is increased is outputted.

In the case where the document ends before the composite region of the additional image starts to be drawn, or in the case where the document ends before drawing the composite region of the additional image is finished, the outputting controller 46 may add a white line and may draw the entire additional image.

Example of Operation of Image Processing Apparatus

FIG. 16A to FIG. 18B are flowcharts illustrating an example of the operation of the image processing apparatus 30 according to the present exemplary embodiment. In the case described herein, the copy condition setting part 41 sets the synchronous cutting copy as the selection from the fixed form copy and the synchronous cutting copy, sets an equal size as the magnification, and sets roll paper as the paper.

Figure 16A:
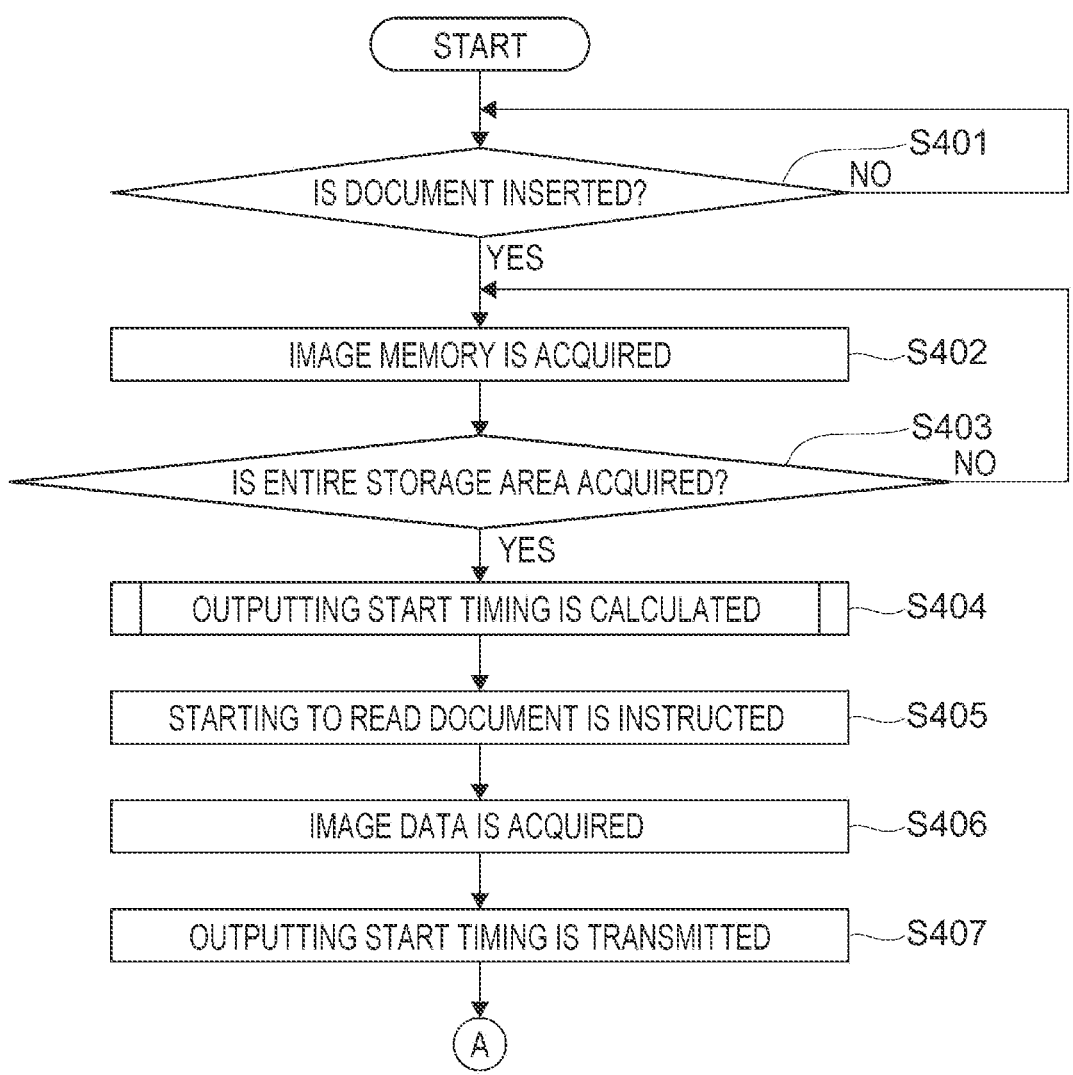
FIG. 16A is a flowchart of a reading routine of the image processing apparatus according to the exemplary embodiment of the present disclosure.
Figure 16B:
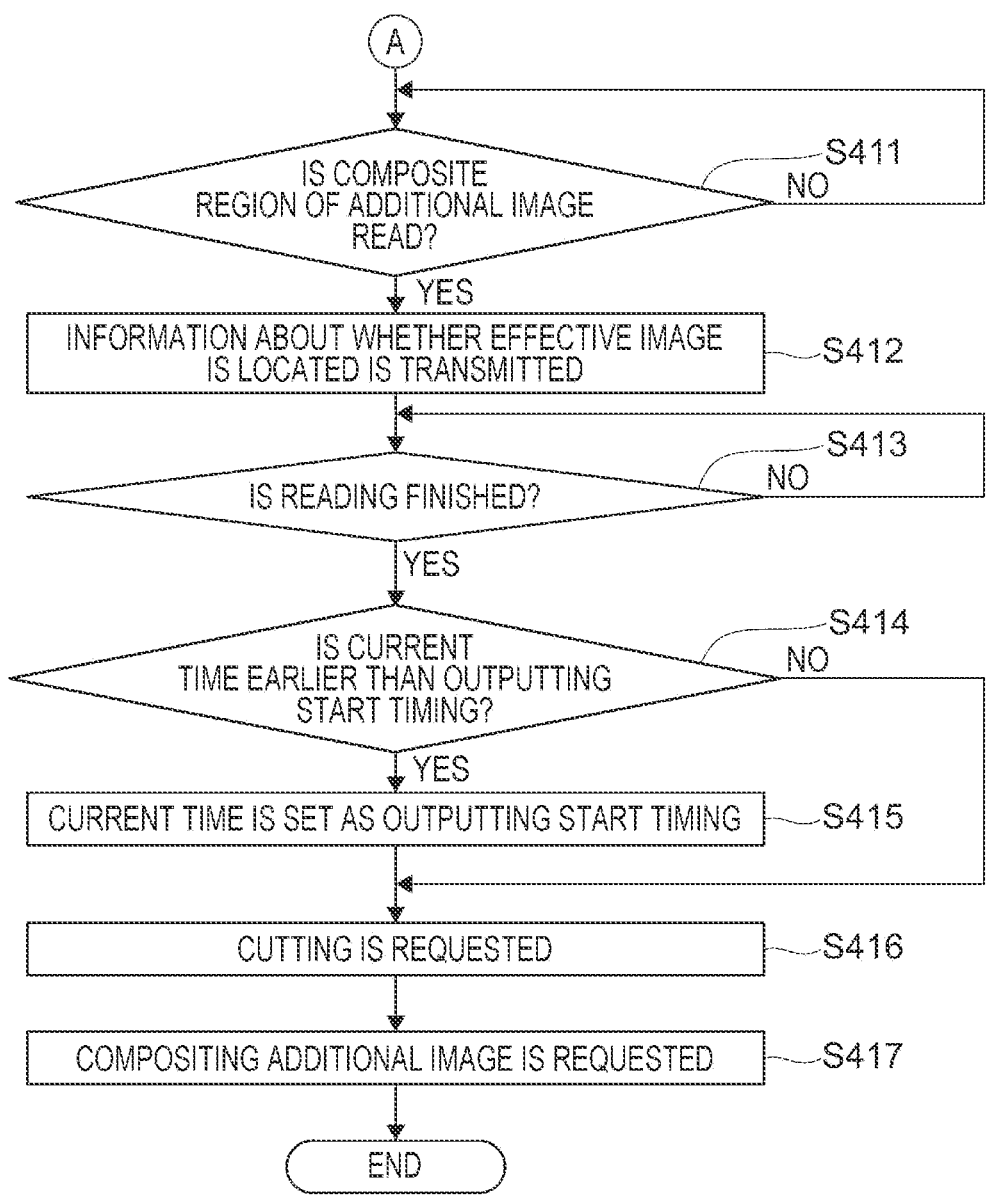
FIG. 16B is a flowchart of the reading routine of the image processing apparatus according to the exemplary embodiment of the present disclosure.

FIG. 16A and FIG. 16B are flowcharts for the reading routine of the image processing apparatus 30. After the copy condition setting part 41 sets the various copy conditions, the image processing apparatus 30 performs the reading routine.

As for the image processing apparatus 30, as illustrated in FIG. 16A, the reading controller 42 first determines whether a document is inserted via the document entrance 100a (a step 401) and waits as it is if no document is inserted. If the document is inserted, and the sensor F1 detects the leading edge of the document, the reading controller 42 acquires the entire storage area in the image memory 43 as a storage area for storing the image data that is read from the document (a step 402). The reading controller 42 subsequently determines whether the entire storage area is acquired at the step 402 (a step 403) and performs a process at the step 402 again if the entire storage area is not acquired.

If the entire storage area is acquired at the step 402, the outputting start timing calculation unit 44 calculates the outputting start timing (a step 404). That is, the outputting start timing calculation unit 44 performs processes illustrated in FIG. 17 to acquire the print delay time T2 from the reading start timing of the image data until the outputting start timing.

Subsequently, the reading controller 42 instructs the document reading apparatus 10 to start to read the document (a step 405). As a result, the light detection sensors that are included in the reading sensor 110 start to scan the output signals and sequentially transmit the image data that is acquired every time scanning is repeated to the image processing apparatus 30. Consequently, the reading controller 42 acquires the image data (a step 406).

Subsequently, the outputting start timing calculation unit 44 waits for the reading controller 42 to start to input the image data into the image memory 43 and sets the outputting start timing of the image data in response to the first input of the image data (a request for outputting) (a step 407). That is, a time acquired by adding the print delay time T2 that is acquired at the step 404 into the current time at which the image data is inputted at the first time is set as the outputting start timing of the image data.

Subsequently, as illustrated in FIG. 16B, the reading controller 42 determines whether the composite region of the additional image is read (a step 411). At this time, the reading controller 42 sets the position of the leading edge and the position of the trailing edge of the composite region of the additional image. The case where the copy condition setting part 41 sets a paper leading edge base point as the base point on the composite region of the additional image will now be described. In this case, the reading controller 42 sets the position of an offset from the paper leading edge base point as the position of the leading edge of the composite region of the additional image. The reading controller 42 sets a position away from the position of the leading edge toward the trailing edge by the height of the additional image that is acquired from the additional image generation unit 45 as the position of the trailing edge of the composite region of the additional image. The case where the copy condition setting part 41 sets a paper trailing edge base point as the base point on the composite region of the additional image will now be described. In this case, the reading controller 42 sets a position away from the position of the predetermined maximum document length toward the leading edge by an offset value from the paper trailing edge base point as the position of the trailing edge of the composite region of the additional image. The reading controller 42 sets a position away from the position of the trailing edge toward the leading edge by the height of the additional image that is acquired from the additional image generation unit 45 as the position of the leading edge of the composite region of the additional image. If the composite region of the additional image is not read, the reading controller 42 waits as it is. If the composite region of the additional image is read, the reading controller 42 determines whether the effective image is located in the composite region of the additional image and sets information about the result of determination (a step 412).

Subsequently, the reading controller 42 determines whether the document reading apparatus 10 finishes reading the document while continuing a process of acquiring the image data and inputting the image data into the image memory 43 (a step 413) and waits as it is if reading the document is not finished. When reading the document is finished, the outputting start timing calculation unit 44 determines whether the current time T3 is earlier than the outputting start timing that is set at the step 407 in FIG. 16A (a step 414).

If the current time T3 is earlier than the outputting start timing, the outputting start timing calculation unit 44 sets the current time T3 as the new outputting start timing (a step 415). Here, the time that is set as the new outputting start timing is the current time T3 for convenience. In a strict sense, the time may be acquired by adding a time required for transmitting information about time to the outputting controller 46 into the current time T3. If the current time T3 is not earlier than the outputting start timing, the outputting start timing calculation unit 44 does not perform the step 415.

Subsequently, the reading controller 42 performs a process for transmitting a request for cutting (a step 416). That is, the reading controller 42 detects the length of the document by using the sensor F1 in the document reading apparatus 10 and sets the detected length of the document as the cut length of the copy paper.

Subsequently, the reading controller 42 performs a process for transmitting a request for compositing the additional image (a step 417). That is, the reading controller 42 sets the position of the leading edge and the position of the trailing edge of the composite region of the additional image. In the case where the copy condition setting part 41 sets the paper leading edge base point as the base point on the composite region of the additional image, the reading controller 42 sets the position of the leading edge and the position of the trailing edge of the composite region of the additional image as described for the step 411. In the case where the copy condition setting part 41 sets the paper trailing edge base point as the base point on the composite region of the additional image, the reading controller 42 uses the length of the document that is detected at the step 416 instead of the predetermined maximum document length and sets the position of the leading edge and the position of the trailing edge of the composite region of the additional image as described for the step 411. In the case where the length of the document that is detected at the step 416 is shorter than the predetermined maximum document length, the outputting controller 46 may determine whether the effective image is located in the composite region of the additional image that is set at the step 417 and may replace the information that is set at the step 412 with information about the result of determination. Through the above processing, the reading routine ends.

Figure 17:
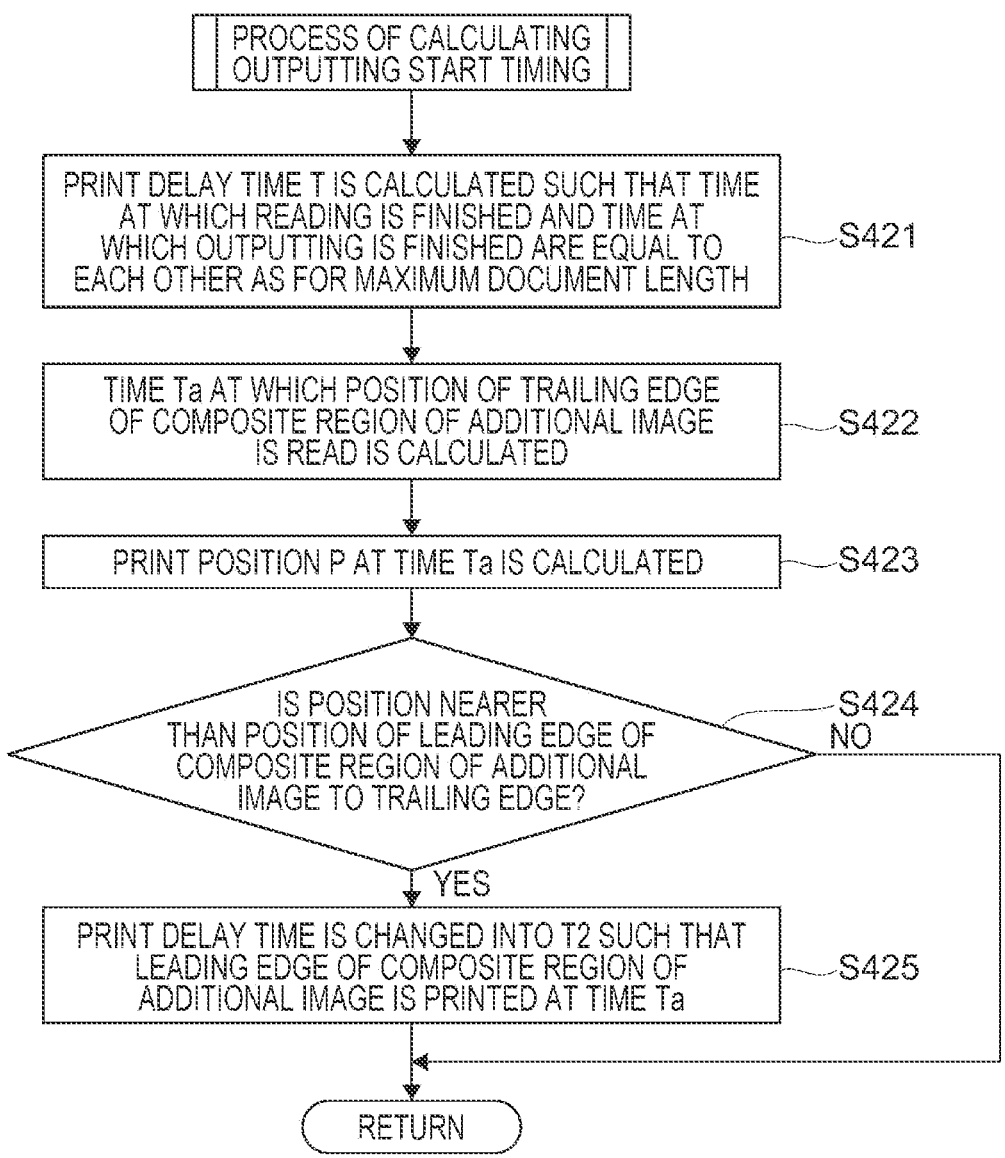
FIG. 17 is a flowchart illustrating the content of a process of calculating the outputting start timing.

FIG. 17 is a flowchart illustrating the content of a process of calculating the outputting start timing at the step 404 in FIG. 16A.

The outputting start timing calculation unit 44 first calculates the print delay time T such that a time at which reading is finished and a time at which outputting is finished are equal to each other as for the maximum document length (a step 421) as illustrated.

Subsequently, the outputting start timing calculation unit 44 calculates the time Ta at which the position of the trailing edge of the composite region of the additional image is read (a step 422). At this time, the outputting start timing calculation unit 44 specifies the position of the trailing edge of the composite region of the additional image as described for the step 411 in FIG. 16B.

Subsequently, the outputting start timing calculation unit 44 calculates the position P on the document to be printed at the time Ta (a step 423).

Subsequently, the outputting start timing calculation unit 44 determines whether the position P on the document to be printed is nearer than the position of the leading edge of the composite region of the additional image to the trailing edge (a step 424). At this time, the outputting start timing calculation unit 44 specifies the position of the leading edge of the composite region of the additional image as described for the step 411 in FIG. 16B. If the position P on the document to be printed is nearer than the position of the leading edge of the composite region of the additional image to the trailing edge, the outputting start timing calculation unit 44 changes the print delay time into T2 such that the leading edge of the composite region of the additional image is printed at the time Ta (a step 425). If the position P on the document to be printed is not nearer than the position of the leading edge of the composite region of the additional image to the trailing edge, the outputting start timing calculation unit 44 does not perform the step 425.

Figure 18A:
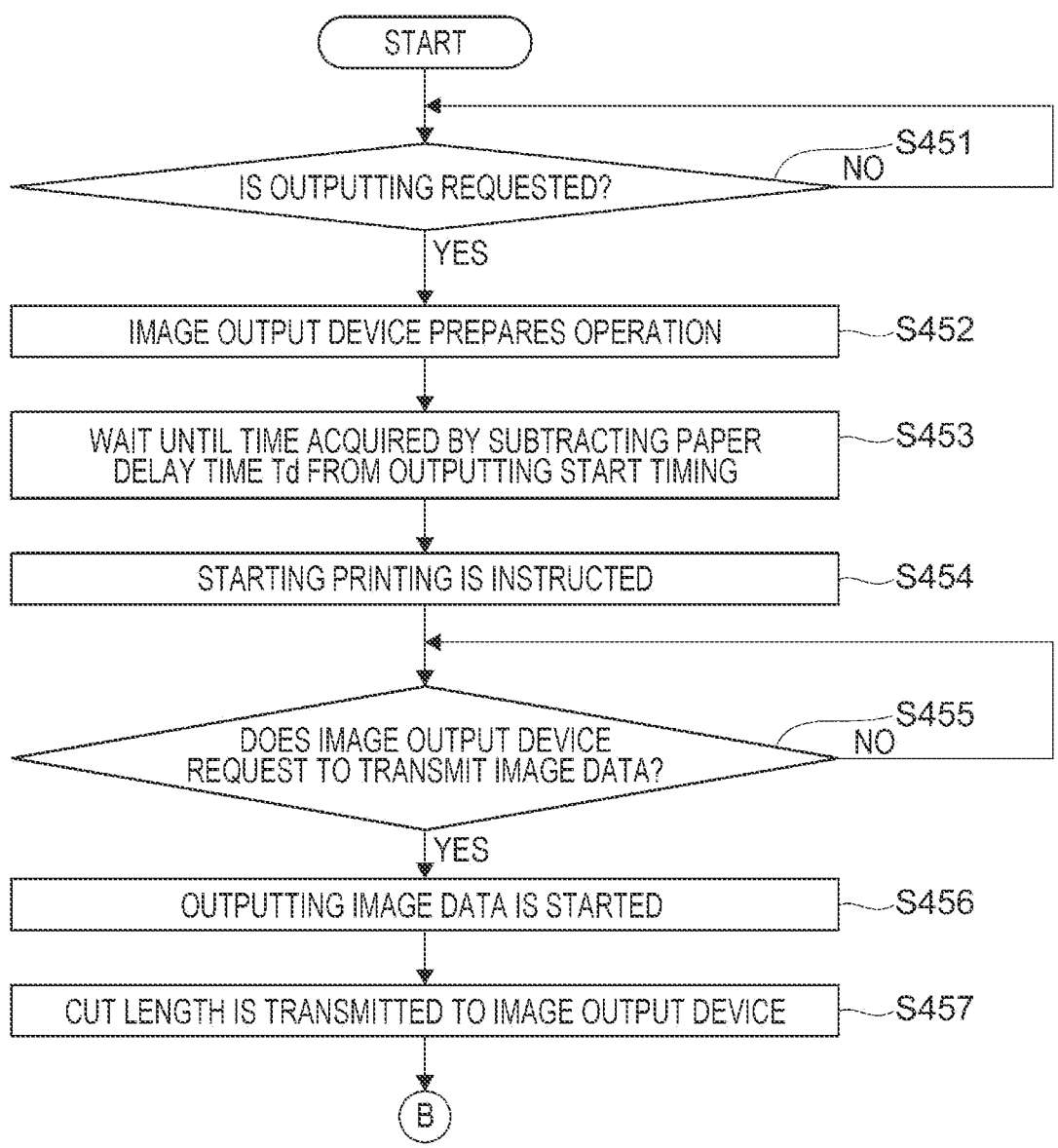
FIG. 18A is a flowchart of an outputting routine of the image processing apparatus according to the exemplary embodiment of the present disclosure.
Figure 18B:
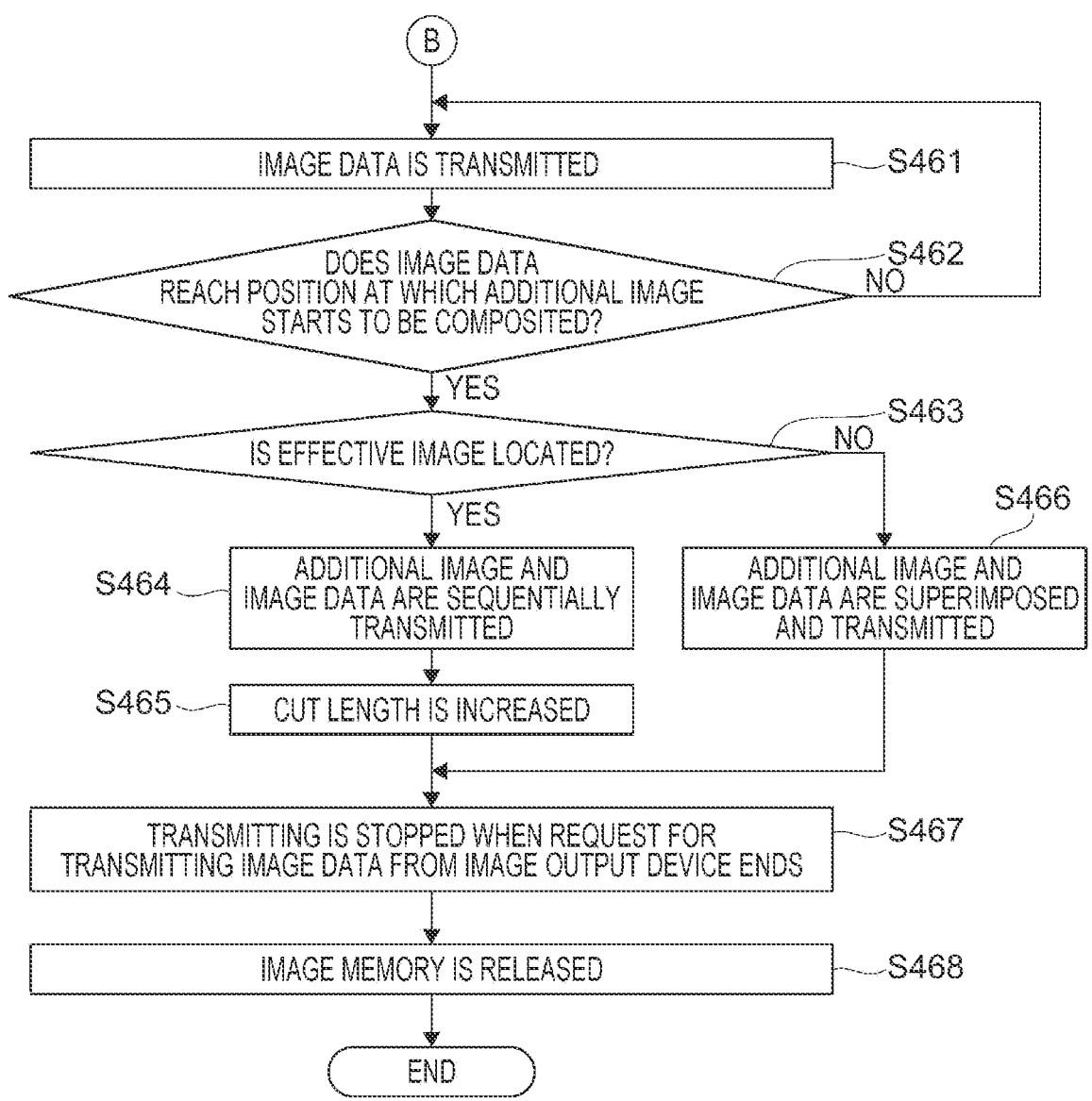
FIG. 18B is a flowchart of the outputting routine of the image processing apparatus according to the exemplary embodiment of the present disclosure.

FIG. 18A and FIG. 18B are flowcharts illustrating the outputting routine of the image processing apparatus 30. The outputting routine is performed while the processes in FIG. 16A and FIG. 16B are performed.

As for the image processing apparatus 30, as illustrated in FIG. 18A, the outputting controller 46 first determines whether the reading controller 42 requests outputting (a step 451) and waits as it is if outputting is not requested. When the outputting start timing is set at the step 407 in FIG. 16A (the request for outputting), the result of determination at the step 451 is "YES", and the outputting controller 46 causes the image output device 20 to prepare the operation thereof (a step 452).

Subsequently, the outputting controller 46 acquires a time by subtracting the paper delay time Td from the outputting start timing that is set at the step 407 in FIG. 16A, waits until the time (a step 453), and subsequently instructs the image output device 20 to start printing (a step 454). The paper delay time Td is a time required for the copy paper to reach the resist sensor 222 in front of the transfer unit 220 from paper supplying units (the cut paper supplying units 201 and 202 and the roll paper supplying unit 210). The paper delay time Td has a value that changes depending on a selection from the cut paper supplying units 201 and 202 and the roll paper supplying unit 210 among the paper supplying units. The roll paper supplying unit 210 is selected here. Accordingly, the paper delay time Td suitable for the roll paper supplying unit 210 is selected at the step 453, and a time at which an instruction for starting printing is transmitted is calculated based on the selected Td. Subsequently, the outputting controller 46 determines whether the image output device 20 requests to start to output the image data (a step 455).

As a result of an instruction for starting printing at the step 454, the copy paper is supplied to the image output device 20 from the roll paper supplying unit 210. When the copy paper reaches the position of the resist sensor 222, a request for starting to output the image data is transmitted from the image output device 20 to the image processing apparatus 30. In the case where the request for starting outputting is received before determination is made at the step 455, the outputting controller 46 starts to output the image data from the image memory 43 (a step 456).

Subsequently, the outputting controller 46 reads the cut length that is set at the step 416 in FIG. 16B and transmits the cut length to the image output device 20 (a step 457). As a result, the image output device 20 requests the image processing apparatus 30 to transmit the image data in a period in which the received cut length of the copy paper is fed from the roll paper supplying unit 210. As illustrated in FIG. 18B, the outputting controller 46 transmits the image data in response to this request (a step 461), and the image output device 20 transfers an image in accordance with the transmitted image data.

Subsequently, the outputting controller 46 determines whether the image data that is outputted from the image memory 43 reaches the composite region of the additional image (a step 462). The composite region of the additional image is determined by using the position of the leading edge and the position of the trailing edge that are set at the step 417 in FIG. 16B. If the image data does not reach the composite region of the additional image, the outputting controller 46 performs a process at the step 461 again. If the image data reaches the composite region of the additional image, the outputting controller 46 determines whether the effective image is located in the composite region of the additional image (a step 463). The outputting controller 46 makes the determination, based on the information that is set at the step 412 in FIG. 16B.

Figure 6:
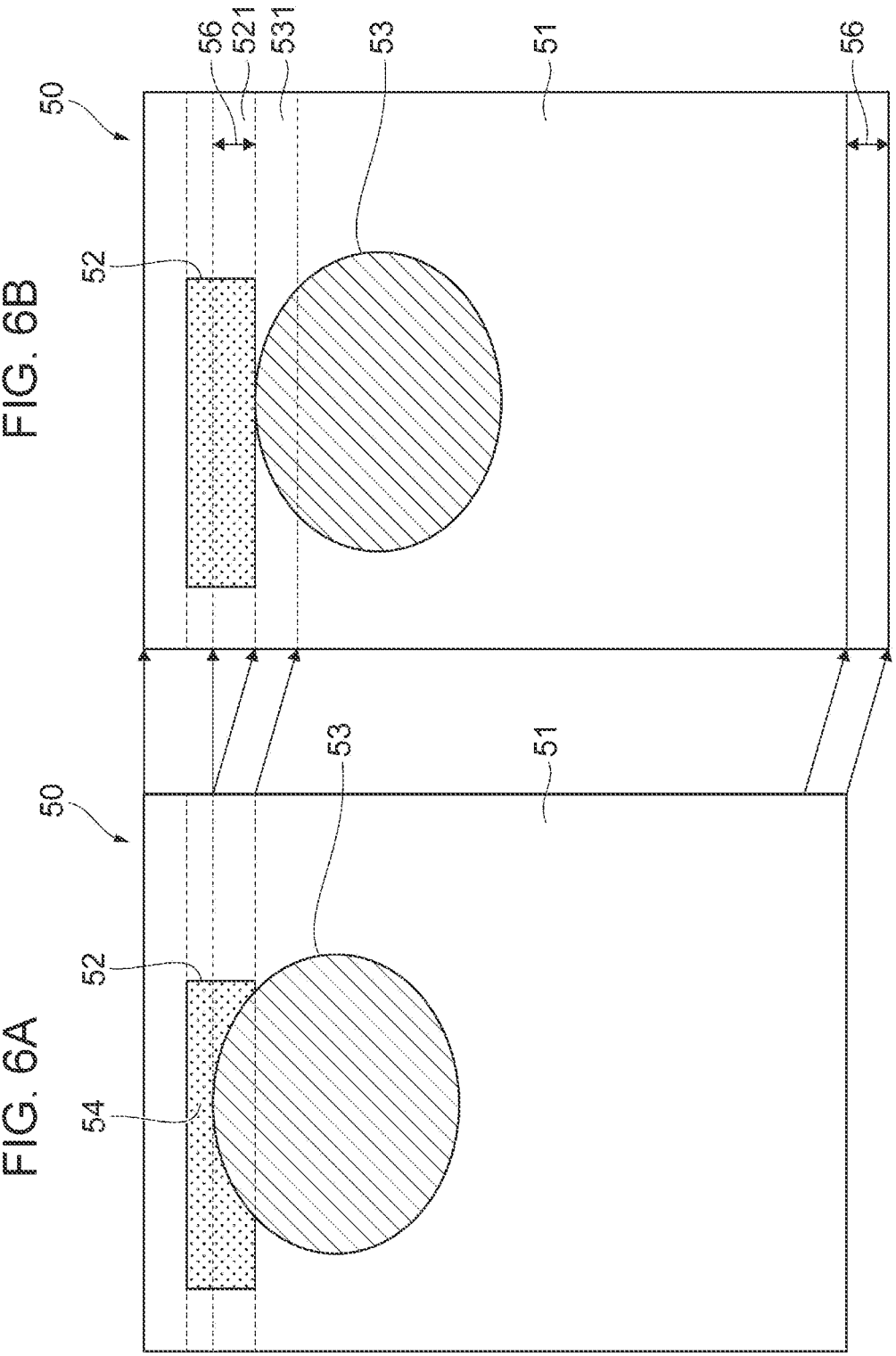
FIG. 6A and FIG. 6B illustrate a second example of compositing in the case where the effective image in the read image of the document and the annotation image overlap.
Figure 7:
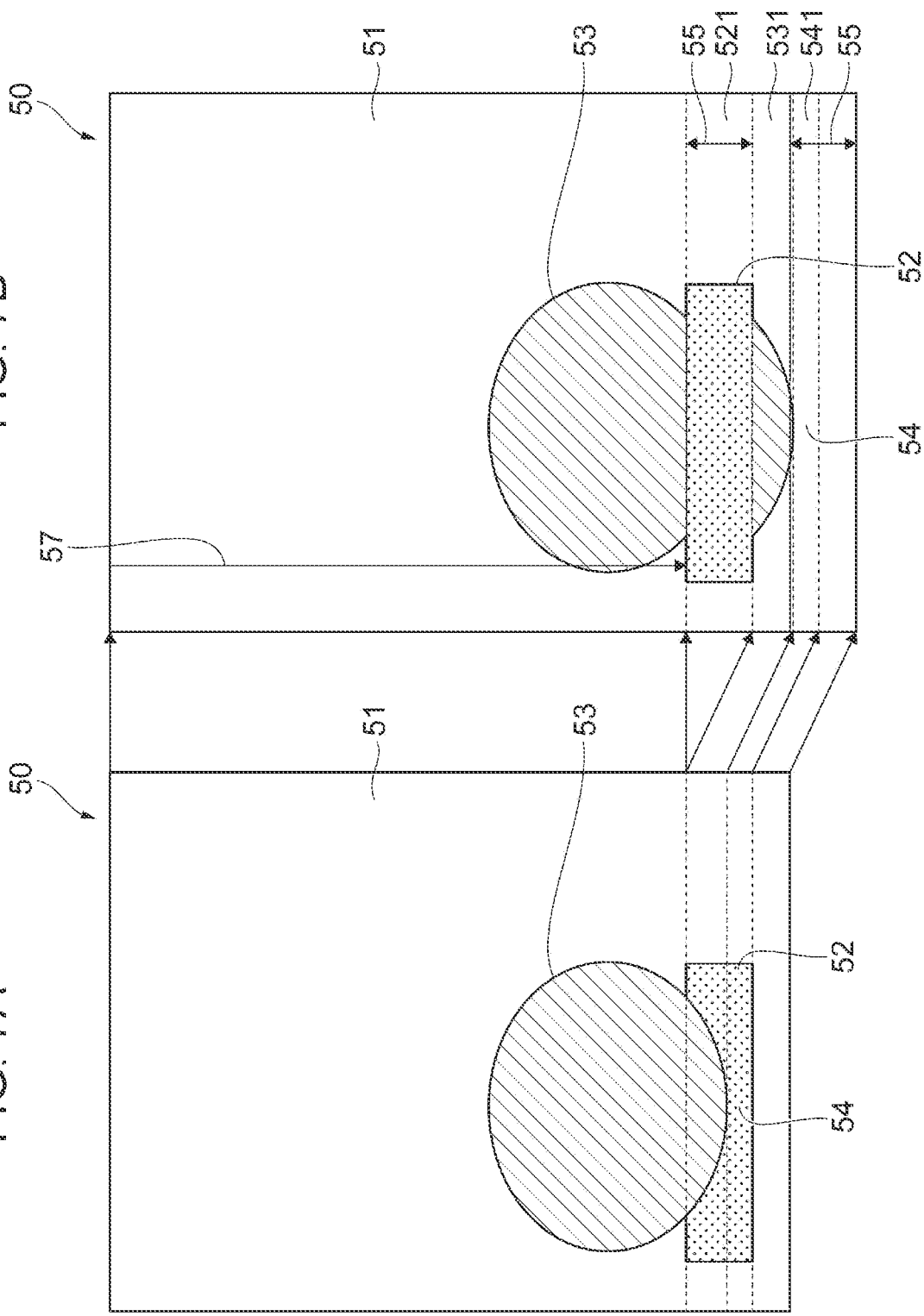
FIG. 7A and FIG. 7B illustrate an example of compositing for maintaining an offset of the annotation image from a paper leading edge in the case where the effective image in the read image of the document and the annotation image overlap.
Figure 8:
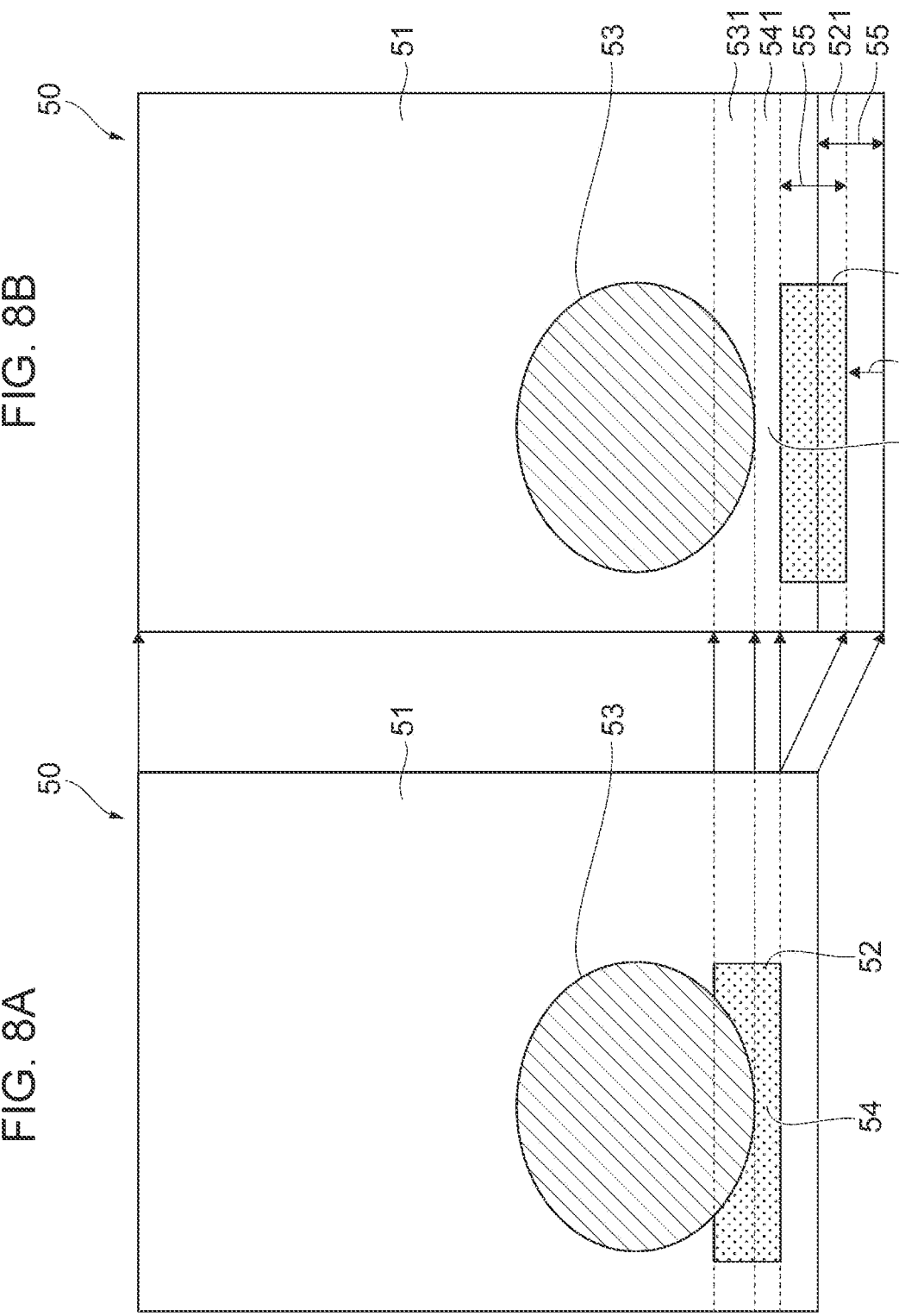
FIG. 8A and FIG. 8B illustrate an example of compositing for maintaining an offset of the annotation image from a paper trailing edge in the case where the effective image in the read image of the document and the annotation image overlap.

If the effective image is located in the composite region of the additional image, the outputting controller 46 sequentially transmits the white line with which the additional image that is generated by the additional image generation unit 45 is composited and the image line that contains the portion that overlaps the composite region of the additional image of the image data to the image output device 20 (a step 464). For example, the outputting controller 46 may transmit the image line after transmitting the white line as illustrated in FIG. 5A to FIG. 7B or may transmit the white line after transmitting the image line as illustrated in FIG. 8A and FIG. 8B. At this time, the outputting controller 46 may transmit the white line that contains the white portion at which the effective image is not located in the portion that overlaps the composite region of the additional image of the image data as illustrated in FIG. 5A, FIG. 5B, FIG. 7A, FIG. 7B, FIG. 8A, and FIG. 8B or as illustrated in FIG. 6A and FIG. 6B.

Subsequently, the outputting controller 46 transmits an instruction for increasing the cut length to the image output device 20 depending on the structure of the data that is transmitted at the step 464 (a step 465). For example, in the case where the white line that contains the white portion at which the effective image is not located in the portion that overlaps the composite region of the additional image of the image data is transmitted at the step 464, the outputting controller 46 increases the cut length by the height of the composite region of the additional image. In the case where the white line that contains the white portion at which the effective image is not located in the portion that overlaps the composite region of the additional image of the image data is not transmitted at the step 464, the outputting controller 46 increases the cut length by the height of a portion at which the effective image is located in the composite region of the additional image.

If the effective image is not located in the composite region of the additional image, the outputting controller 46 transmits the image line that contains the image acquired by superimposing the additional image that is generated by the additional image generation unit 45 on the portion that overlaps the composite region of the additional image of the image data to the image output device 20 (a step 466).

The outputting controller 46 transmits the image data from the image memory 43 to the image output device 20 only in a period in which a request for transmitting the image data is received after transmitting the cut length at the step 457 in FIG. 18A and stops transmitting the image data when the request for transmitting ends (a step 467). The outputting controller 46 releases the image memory 43 (a step 468). Through the above processing, the outputting routine ends.

Finally, outputting for representing that the copy paper is extended by the outputting controller 46 will be described.

The case where the outputting controller 46 causes the operation panel 35 to display information that represents that the copy paper is extended will now be described.

According to the present exemplary embodiment, whether the effective image is located in the composite region of the additional image when reading the trailing edge of the composite region of the additional image is finished is determined. Whether the copy paper is extended is determined at this time, and accordingly, the outputting controller 46 causes the operation panel 35 to display the information that represents that the copy paper is extended at this time at the earliest.

The outputting controller 46 may cause the operation panel 35 to display a paper extension message such as the "paper is extended such that an annotation and a document image do not overlap". When copying is finished, the outputting controller 46 may change the display on the operation panel 35 into a copy finish message such as "copying is finished". In the case where a period in which the paper extension message is displayed is short, the outputting controller 46 may cause the operation panel 35 to display the paper extension message for a predetermined period, and the copy finish message may be subsequently displayed.

The case where the outputting controller 46 records the fact that the copy paper is extended as a process history in the HDD 34 will now be described.

In the case where the copy paper is extended, the outputting controller 46 may record information that represents this as the process history by using any one of methods described below.

In a first method, an output paper size in the process history is not fixed but is expressed by using the width and the length of the paper.

In a second method, an item for recording whether the additional image is outputted is added to the process history.

FIG. 19 illustrates an example of a process history 70 in this case. As for the process history 70, for example, items 71 and 72 correspond to the width and the length of the paper in the first method. An item 73 corresponds to whether the additional image is outputted in the second method. In the case where the copy paper is extended, for example, "present (extended)" may be recorded in the item 73.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

Processing that is performed by the image processing apparatus 30 according to the present exemplary embodiment is prepared, for example, as a program such as application software.

In this case, a program for carrying out the present exemplary embodiment causes a computer to perform a function of acquiring the read image of the document that is read by the document reading apparatus and a function of controlling the image output device such that the read image and the additional image are outputted to the medium with the significance portion and the additional image prevented from overlapping, and the length of the medium in the sub scanning direction is increased in the case where the significance portion of the read image and the specified region of the read image to which the additional image is decided to be added overlap.

The program for carrying out the present exemplary embodiment may be provided by using a communication unit or may be provided as a program that is stored in a recording medium such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
 a processor configured to:
  acquire a read image of a document that is read by a document reading apparatus; and
  control an image output device such that the read image and an additional image are outputted to a medium with a significance portion and the additional image prevented from overlapping, and a length of the medium in a sub scanning direction is increased in a case where the significance portion of the read image and a specified region of the read image to which the additional image is decided to be added overlap.

2. The image processing apparatus according to claim 1, wherein the processor is configured to control the image output device such that the length of the medium in the sub scanning direction is increased by a length of the specified region in the sub scanning direction.

3. The image processing apparatus according to claim 2, wherein the processor is configured to control the image output device such that a portion that overlaps the specified region of the read image is outputted after the additional image is outputted.

4. The image processing apparatus according to claim 2, wherein the processor is configured to control the image output device such that the additional image is outputted after a portion that overlaps the specified region of the read image is outputted.

5. The image processing apparatus according to claim 1, wherein the processor is configured to control the image output device such that the length of the medium in the sub scanning direction is increased by a length of a part of the specified region that overlaps the significance portion in the sub scanning direction.

6. The image processing apparatus according to claim 5, wherein the processor is configured to control the image output device such that a part of the significance portion that overlaps the specified region is outputted after the additional image is outputted.

7. The image processing apparatus according to claim 5, wherein the processor is configured to control the image output device such that the additional image is outputted after a part of the significance portion that overlaps the specified region is outputted.

8. The image processing apparatus according to claim 1, wherein the document reading apparatus reads the document at a first speed,
wherein the image output device outputs the read image to the medium at a second speed higher than the first speed, and
wherein the processor is configured to control the image output device such that the read image starts to be outputted to the medium after the document reading apparatus starts to read the document and after a wait time depending on a position of the specified region in the sub scanning direction has elapsed.

9. The image processing apparatus according to claim 8, wherein the processor is configured to control the image output device such that the additional image is outputted if the significance portion and the specified region overlap after the document reading apparatus finishes reading the specified region, and a part of the significance portion that overlaps the specified region is subsequently outputted.

10. The image processing apparatus according to claim 8, wherein the processor is configured to control the image output device such that at least the additional image is outputted if the significance portion and the specified region do not overlap after the document reading apparatus finishes reading the specified region, and a part of the significance portion nearer than the specified region to a trailing edge in the sub scanning direction is subsequently outputted.

11. The image processing apparatus according to claim 8, wherein the processor is configured to control the image output device such that the read image starts to be outputted to the medium after the document reading apparatus finishes reading and before the wait time has elapsed in a case where the document reading apparatus finishes reading after the document reading apparatus starts to read the document and before the wait time has elapsed.

12. The image processing apparatus according to claim 1, wherein the processor is configured to output information that represents that the length of the medium in the sub scanning direction is increased.

13. A non-transitory computer readable medium storing a program causing a computer to execute a process comprising:
acquiring a read image of a document that is read by a document reading apparatus; and
controlling an image output device such that the read image and an additional image are outputted to a medium with a significance portion and the additional image prevented from overlapping, and a length of the medium in a sub scanning direction is increased in a case where the significance portion of the read image and a specified region of the read image to which the additional image is decided to be added overlap.

14. A method comprising:
acquiring a read image of a document that is read by a document reading apparatus; and
controlling an image output device such that the read image and an additional image are outputted to a medium with a significance portion and the additional image prevented from overlapping, and a length of the medium in a sub scanning direction is increased in a case where the significance portion of the read image and a specified region of the read image to which the additional image is decided to be added overlap.

* * * * *